United States Patent
Macfarlane

(10) Patent No.: US 10,054,450 B2
(45) Date of Patent: Aug. 21, 2018

(54) METHOD AND APPARATUS FOR DETERMINING TRAJECTORY PATHS ON A TRANSPORTATION STRUCTURE

(71) Applicant: HERE Global B.V., Veldhoven (NL)

(72) Inventor: Jane F. Macfarlane, Oakland, CA (US)

(73) Assignee: HERE Global B.V., Veldhoven (NL)

( * ) Notice: Subject to any disclaimer, the term of this patent is extended or adjusted under 35 U.S.C. 154(b) by 53 days.

(21) Appl. No.: 14/550,327

(22) Filed: Nov. 21, 2014

(65) Prior Publication Data

US 2016/0146617 A1    May 26, 2016

(51) Int. Cl.
| | |
|---|---|
| *G01C 21/28* | (2006.01) |
| *G01C 21/30* | (2006.01) |
| *H04W 4/029* | (2018.01) |
| *G01C 21/32* | (2006.01) |

(52) U.S. Cl.
CPC .............. *G01C 21/30* (2013.01); *G01C 21/28* (2013.01); *G01C 21/32* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 2006/0155464 A1* | 7/2006 | Smartt | G01C 21/32 701/450 |
| 2007/0293985 A1 | 12/2007 | Myeong et al. | |
| 2007/0294023 A1 | 12/2007 | Arcot et al. | |
| 2012/0004845 A1 | 1/2012 | Kmiecik et al. | |
| 2012/0095682 A1* | 4/2012 | Wilson | G01C 21/32 701/532 |
| 2012/0277993 A1* | 11/2012 | Mund | G09B 29/106 701/450 |
| 2012/0306923 A1 | 12/2012 | Boschker et al. | |

(Continued)

FOREIGN PATENT DOCUMENTS

| | | |
|---|---|---|
| WO | 2013160471 A2 | 10/2013 |
| WO | 2014080023 A1 | 5/2014 |

OTHER PUBLICATIONS

Y. Hada, et al. "Road Information Sharing Using Probe Vehicle Data in Disasters," The 14th World Conference on Earthquake Engineering, Oct. 12, 2017, 2008, Beijing, China, 9 pages.

(Continued)

*Primary Examiner* — Genna M Mott
(74) *Attorney, Agent, or Firm* — Ditthavong & Steiner, P.C.

(57) ABSTRACT

An approach is provided for determining trajectory paths of a road network. A location platform determines at least one first waypoint and at least one second waypoint of at least one road structure. The at least one first waypoint represents at least one entry point to the at least one road structure, and wherein the at least one second waypoint represents at least one exit point from the at least one road structure. The location platform causes, at least in part, a designation of at least one location trace spanning the at least one first waypoint and the at least one second waypoint as at least one baseline path. The location platform then causes, at least in part, a classification of one or more other location traces with respect to the at least one baseline path.

17 Claims, 19 Drawing Sheets

(56) References Cited

U.S. PATENT DOCUMENTS

2013/0021382 A1* 1/2013 Morlock ............... G01C 21/32
                                                    345/672
2013/0085659 A1* 4/2013 Bekaert ................ G01C 21/26
                                                    701/118
2013/0282264 A1   10/2013 Bastiaensen et al.
2015/0285656 A1* 10/2015 Verheyen ............. G01C 21/32
                                                    701/428

OTHER PUBLICATIONS

Dongwook Lee, et al. "Trajectory-Based Road-Geometry and Crash-Risk Estimation with Smartphone-Assisted Sensor Networks," published Mar. 23, 2014, International Journal of Distributed Sensor Networks, vol. 2014, Article ID 943845, 6 pages.

* cited by examiner

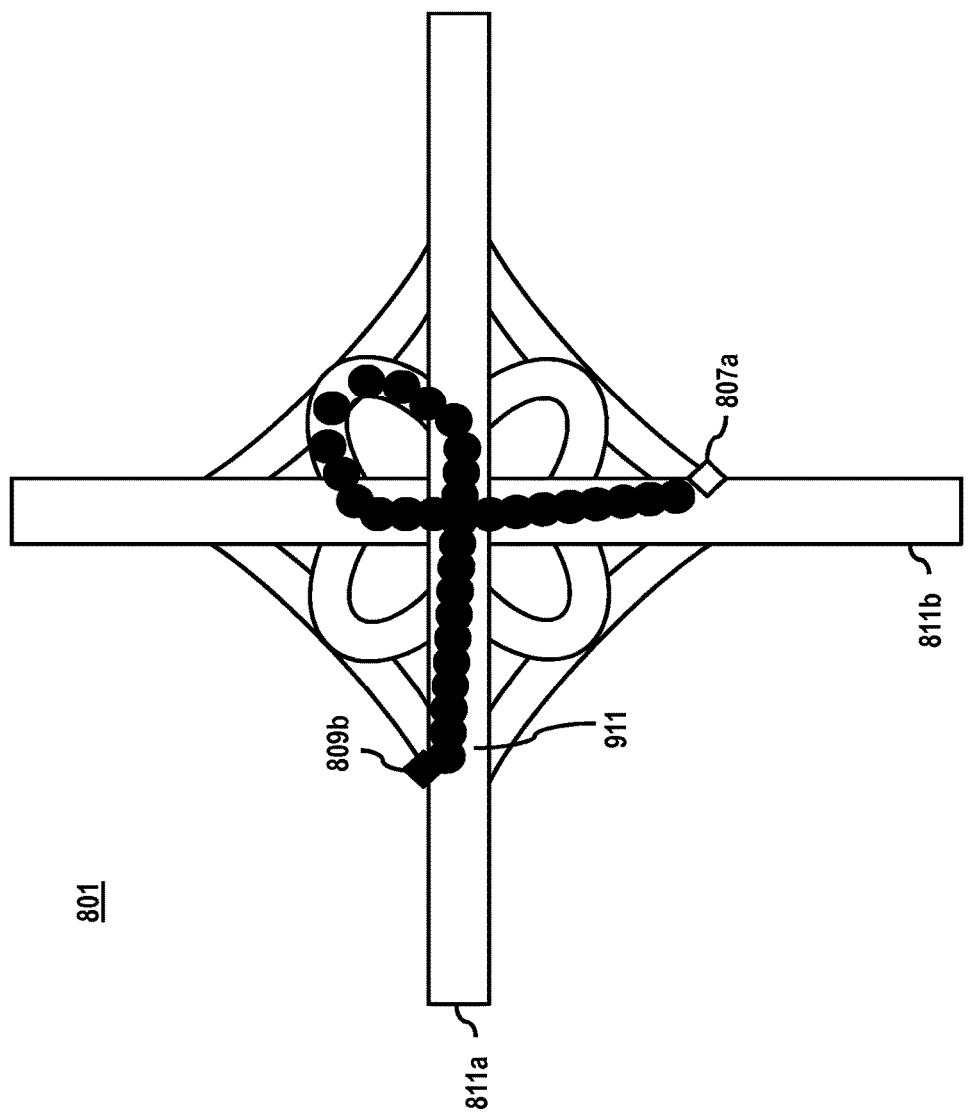

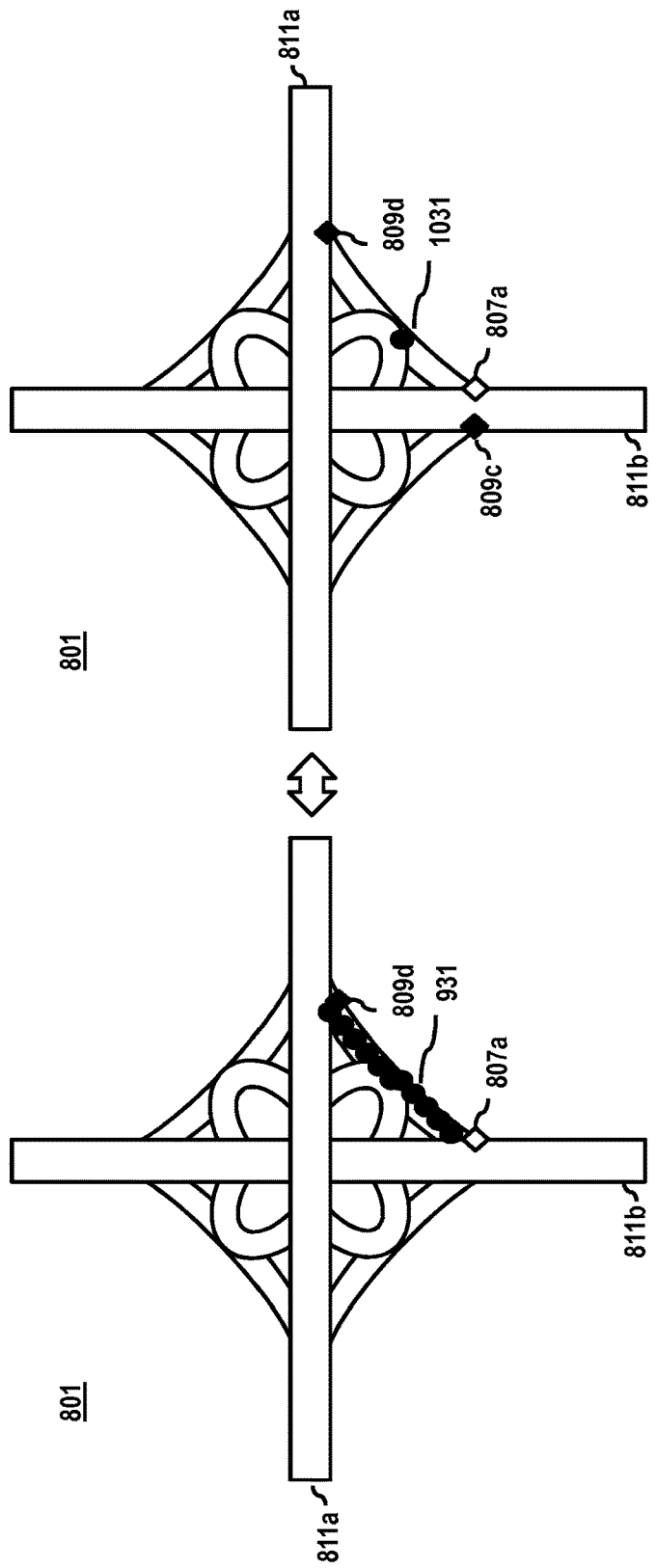

METHOD AND APPARATUS FOR DETERMINING TRAJECTORY PATHS ON A TRANSPORTATION STRUCTURE

BACKGROUND

Service providers and device manufacturers (e.g., wireless, cellular, etc.) are continually challenged to deliver value and convenience to consumers by, for example, providing compelling network services. One area of interest has been the creation and maintenance of mapping and location-based services that respond to users' increasing expectation and demand for up-to-the-minute information. More specifically, there is an interest in providing users with current information (e.g., trajectory paths, traffic flow, configuration, geometry, etc.) about transportation structures (e.g., highway interchanges or intersections) within a road network. However, traditional geospatial data collection approaches can be costly or burdensome, particularly for structures such as interchanges that can often be changed or reconfigured, and therefore, are in need of updated mapping data. Accordingly, service providers and device manufacturers face significant technical challenges to collecting and/or updating geospatial data.

SOME EXAMPLE EMBODIMENTS

Therefore, there is a need for an approach for determining trajectory paths across structures of a road network using collected location data (e.g., probe data) to eliminate or otherwise reduce a need for detailed mapping data about the structures and/or the road network.

According to one embodiment, a method comprises determining at least one first waypoint and at least one second waypoint of at least one road structure. The at least one first waypoint represents at least one entry point to the at least one road structure, and wherein the at least one second waypoint represents at least one exit point from the at least one road structure. The method also comprises causing, at least in part, a designation of at least one location trace spanning the at least one first waypoint and the at least one second waypoint as at least one baseline path. The method further comprises causing, at least in part, a classification of one or more other location traces with respect to the at least one baseline path.

According to another embodiment, an apparatus comprises at least one processor, and at least one memory including computer program code for one or more computer programs, the at least one memory and the computer program code configured to, with the at least one processor, cause, at least in part, the apparatus to determine at least one first waypoint and at least one second waypoint of at least one road structure. The at least one first waypoint represents at least one entry point to the at least one road structure, and wherein the at least one second waypoint represents at least one exit point from the at least one road structure. The apparatus is also caused to designate at least one location trace spanning the at least one first waypoint and the at least one second waypoint as at least one baseline path. The apparatus is further caused to classify one or more other location traces with respect to the at least one baseline path.

According to another embodiment, a computer-readable storage medium carries one or more sequences of one or more instructions which, when executed by one or more processors, cause, at least in part, an apparatus to determine at least one first waypoint and at least one second waypoint of at least one road structure. The at least one first waypoint represents at least one entry point to the at least one road structure, and wherein the at least one second waypoint represents at least one exit point from the at least one road structure. The apparatus is also caused to designate at least one location trace spanning the at least one first waypoint and the at least one second waypoint as at least one baseline path. The apparatus is further caused to classify one or more other location traces with respect to the at least one baseline path.

According to another embodiment, an apparatus comprises means for processing and/or facilitating a processing of location information associated with one or more devices to determine one or more geolocation seeds. The apparatus also comprises means for determining at least one first waypoint and at least one second waypoint of at least one road structure. The at least one first waypoint represents at least one entry point to the at least one road structure, and wherein the at least one second waypoint represents at least one exit point from the at least one road structure. The apparatus further comprises means for causing, at least in part, a designation of at least one location trace spanning the at least one first waypoint and the at least one second waypoint as at least one baseline path. The apparatus further comprises causing, at least in part, a classification of one or more other location traces with respect to the at least one baseline path.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 9A-9D depict baseline paths determined for a road structure, according to various embodiments;

FIG. 10A-10D depict classification results for example location traces, according to various embodiments;

DESCRIPTION OF SOME EMBODIMENTS

Examples of a method, apparatus, and computer program for determining trajectory paths on a road network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
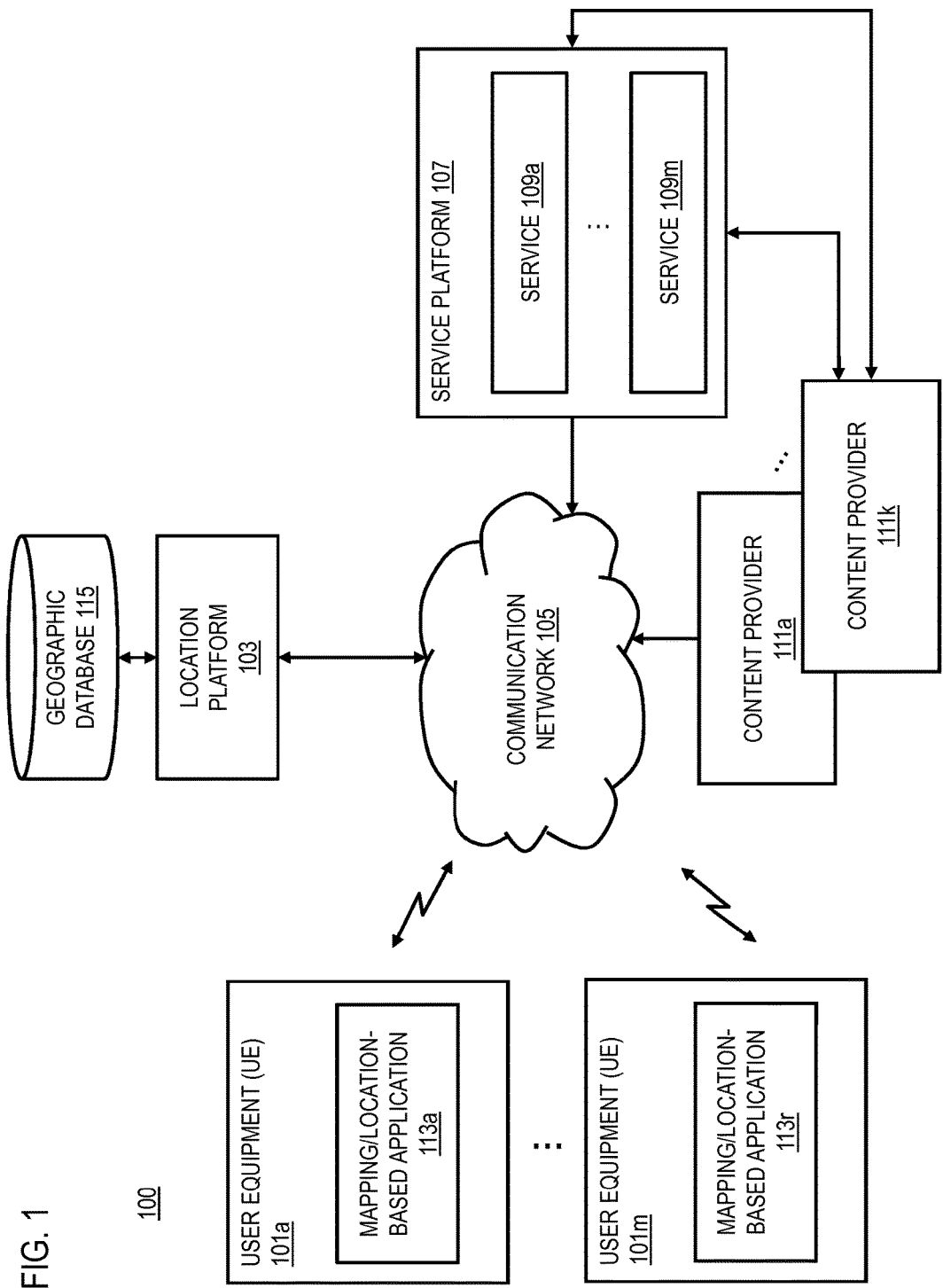
FIG. 1 is a diagram of a system capable of determining trajectory paths for a road network, according to one embodiment.

FIG. 1 is a diagram of a system capable of determining trajectory paths for a road network, according to one embodiment. As previously discussed, service providers and devices manufacturers are interested in developing and improving mapping and location-based services, particularly services that respond to users' increasing demand for up-to-the-minute information. Traditionally, part of the process for maintaining current mapping data includes analysis of data (e.g., location traces) from various probes. In one embodiment, a location trace is a sequence of [e.g., $(x_1, y_1, t_1), (x_2, y_2, t_2), \ldots (x_n, y_n, t_n)$], indicating that a source of the trace (e.g., a navigation-equipped vehicle or other location device) is at position $(x_1, y_1)$ at $t_1$, at position $(x_2, y_2)$ at time $t_2$, and so on. By way of example, a source that contributes its location traces (e.g., probe data) is called a probe.

Historically, a variety of methods exist for analyzing locations traces from probe sources. For example, many of these methods map match the location traces to an underlying map geometry in order to understand the spatial path that the probe source took. However, this map matching process can add a variety of errors and can be very costly to implement. Specifically, because maps often change, in traditional map matching approaches, the location traces must be mapped to the map that was relevant at the time of collection. In addition, the algorithms to determine how to map each location to the underlying geometry vary widely and results are often not consistent or do not correctly map the location traces to the correct path. In summary, traditional map matchers for mapping historical data often rely on an archive of maps that were relevant for the probe data collection times, can introduce incorrect results, can be inconsistent in their results, and can incur significant processing time depending on the algorithm complexity.

To address these limitations, a system 100 of FIG. 1 introduces a capability to use location traces and a simplified representation of representation of geometry for determining trajectory paths through a transportation structure within a road network. In one embodiment, the trajectory paths, for instance, can be used to develop an understanding of vehicle activity in the transportation or road structure. The understanding can be used for variety of subsequent analyses including, for instance, estimating the average time vehicles or other travelers spend on traveling through the transportation structure. As used herein, the term "transportation structure" is used synonymously with "road structure" to represent any physical feature or segment of a road network. For example, a road structure can be a highway interchange, intersection, ramps, or any other physical aspect of a road network. Although various embodiments are discussed with respect to a road network, it is contemplated that the approaches described herein are also applicable to any type of transportation network including rail networks, marine networks, pedestrian networks, and the like. In addition, although the various embodiments described herein are discussed with respect to a transportation structure that is a highway interchange, it is contemplated that the approaches described herein are applicable to any type of structure within a transportation network.

In one embodiment of the system 100, a structure (e.g., a highway interchange) is represented as a collection of waypoints (e.g., waypoints representing entrance and/or exits of the intersecting highways of the interchange). The system 100, uses these waypoints along with a collection of probe data to estimate travel paths through the interchange. In one embodiment, the waypoints are the only geometry information used to classify location traces. As such, detailed map data is not needed to determine the location trace directions as would be required under traditional map matching approaches for evaluating location traces.

In other words, the system 100 uses the underlying location traces (e.g., obtained from probe data) together with a small set of waypoints to classify the basic flow of the location paths or trajectory paths through the interchange or other transportation structure. In one embodiment, the waypoints create a structure in which to find baseline location paths that are known to have traveled through the structure or interchange. In one embodiment, from the baseline location paths, the best representative path is chosen to perform the role of a geometric representation that traditionally would be provided by map data. The system 100 then adaptively map-matches the other location traces in the probe data set to this representative baseline location trace.

As shown in FIG. 1, the system 100 comprises one or more user equipment (UE) 101a-101m (also collectively referred to as UEs 101) having connectivity to a location platform 103, via a communication network 105. The UEs 101 also have connectivity to a service platform 107 that includes one or more services 109a-109m (also collectivity referred to as services 109) for providing mapping, navigation, and/or location-based services. In one embodiment, the service platform 107 and/or services 109 interact with one or more content providers 111a-111k (also collectively referred to as content providers 111) to provide probe data, mapping information, and/or other related information to the location platform 103.

In one embodiment, the UEs 101 execute one or more location applications 113a-113r (also collectively referred to as location applications 113) for generating probe data and transmitting the probe data to the location platform 103. For example, the location application 113 can be a navigation application through which a user of the UEs 101 has agreed to collect and provide probe data to the location platform 103. For example, the navigation application 113 can store the probe data or location traces as the UE 101 navigates. In addition or alternatively, the location application 113 can be an application specifically dedicated to collecting probe data for the location platform 103.

In one embodiment, the collected probe data includes, for instance, a second of location coordinates in combination with a time at which the coordinates were determined (as described above). In another embodiment, the probe data may constitute any location data from which location information, heading information, etc. can be derived to calculate a trajectory path. In yet another embodiment, the probe data may include additional sensor data (e.g., compass, accelerometer data, etc.) for calculating trajectory paths.

In one embodiment, the location platform 103 performs the functions of determining trajectory paths within a road network as discussed with respect to the various embodiments described herein. By way of example, the location platform 103 may exist independently or within a cloud computing and/or cloud storage platform. Moreover, the location platform 103 can be configured to determine trajectory paths on a batch basis or in real-time/substantially real-time. For example, to perform real-time analysis, the location platform 103 can be configured in an edge computing architecture. In one embodiment, the location platform 103 has connectivity to a geographic database 115 for accessing and/or storing data related to determining trajectory paths. In one embodiment, the location application 113 can perform all or a portion of the functions of the location platform 103.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a navigation unit (e.g., in-vehicle or standalone), a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, the location application 113, and the location platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the location application 113 and the location platform 103 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
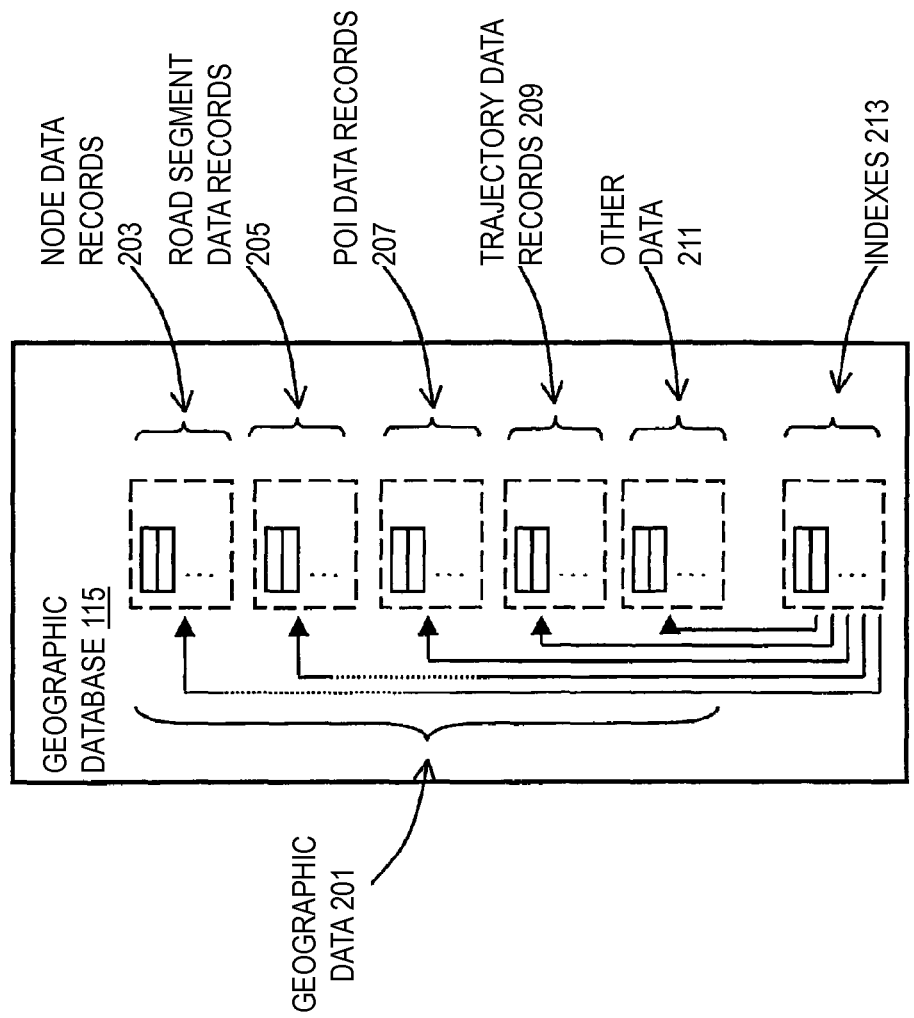
FIG. 2 is a diagram of a geographic database, according to one embodiment.

FIG. 2 is a diagram of a geographic database, according to one embodiment. In one embodiment, the trajectory paths and/or the probe data used for determining the trajectory paths through transportation structures may be stored, associated with, and/or linked to the geographic database 115 or data thereof. Although the geographic database 115 of FIG. 2 includes map data, it is contemplated that the various embodiments described herein may rely solely on the probe data and the waypoints associated with a transportation structure or interchange to determine trajectory paths through the structure. Therefore, in one embodiment, the components of the geographic database 115 related to map data are optional, and in some embodiments, not needed for the location platform 103 to determine trajectory paths.

As shown in FIG. 2, the geographic or map database 115 includes geographic data 201 used for (or configured to be compiled to be used for) navigation-related services. For example, the geographic database 115 includes node data records 203, road segment or link data records 205, POI data records 207, trajectory data records 209, other data records 211, and indexes 213 to the geographic data 201. More, fewer, or different data records may be provided. In one embodiment, the other data records 211 include cartographic ("carto") data records, routing data, and maneuver data.

In one embodiment, the road segment data records 205 are links or segments representing roads, streets, or paths. The node data records 203 are end points corresponding to the respective links or segments of the road segment data records 205. The road link data records 205 and the node data records 203 represent a road network, such as used by vehicles, cars, and/or other entities. Alternatively, the geographic database 115 contains path segment and node data records or other data that represent pedestrian paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 may include data about the POIs and their respective locations in the POI data records 207. The geographic database 119 may also include data about places, such as cities, towns, or other communities, and other geographic features, such as bodies of water, mountain ranges, etc. Such place or feature data may be part of the POI data 207 or may be associated with POIs or POI data 207 (such as a data point used for displaying or representing a position of a city). In addition, the geographic database 115 may include data about location-based events and their respective locations in the event data records 207. By way of example, the location-based events include any type of event that is associated with a particular location including, for instance, traffic, accidents, construction, public gatherings, etc.

In one embodiment, the geographic database include trajectory data records 209 for determining trajectory paths through a transportation structure. For example, the trajectory data records 209 may include probe data collected from UEs 101 that contain location traces through one or more transportation structures. The trajectory data records 209 may also store the baseline paths determined by the location platform 103 as well as the results of classifying other location traces with respect to the baseline paths. In yet another embodiment, the trajectory data records 209 include the results of additional analytics applied to the trajectory data to determine, for instance, traffic flow data through transportation structures, volume of traffic flows through the structures, and the like. In some embodiments, the trajectory data records 209 can be further segmented or categorized according to one or more contextual parameters (e.g., temporal parameters, mode of transport parameters, vehicle type, etc.).

The geographic database 115 may be maintained by the content provider 111 (e.g., a map developer). The map developer 111 collects geographic data to generate and enhance the database 115. There are different ways used by the map developer 111 to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The geographic database 115 may be a master geographic database stored in a format that facilitates updating, maintenance, and development. For example, the master geographic database 115 or data in the master geographic database 115 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 115 may be a master geographic database, but in alternate embodiments, the database may represent a compiled navigation database that may be used in or with end user devices (e.g., UEs 101) to provided navigation or map-related functions. For example, the database 115 may be used with the end user device 101 to provide an end user with navigation features. In such a case, the database may be downloaded or stored on the end user device 101, or the end user device 101 may access the database 115 through a wireless or wired connection (such as via a server and/or network 105).

In one embodiment, the end user device or UE 101 is an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the navigation device 101 is a cellular telephone. An end user may use the device 101 for navigation functions such as guidance and map display.

Figure 3:
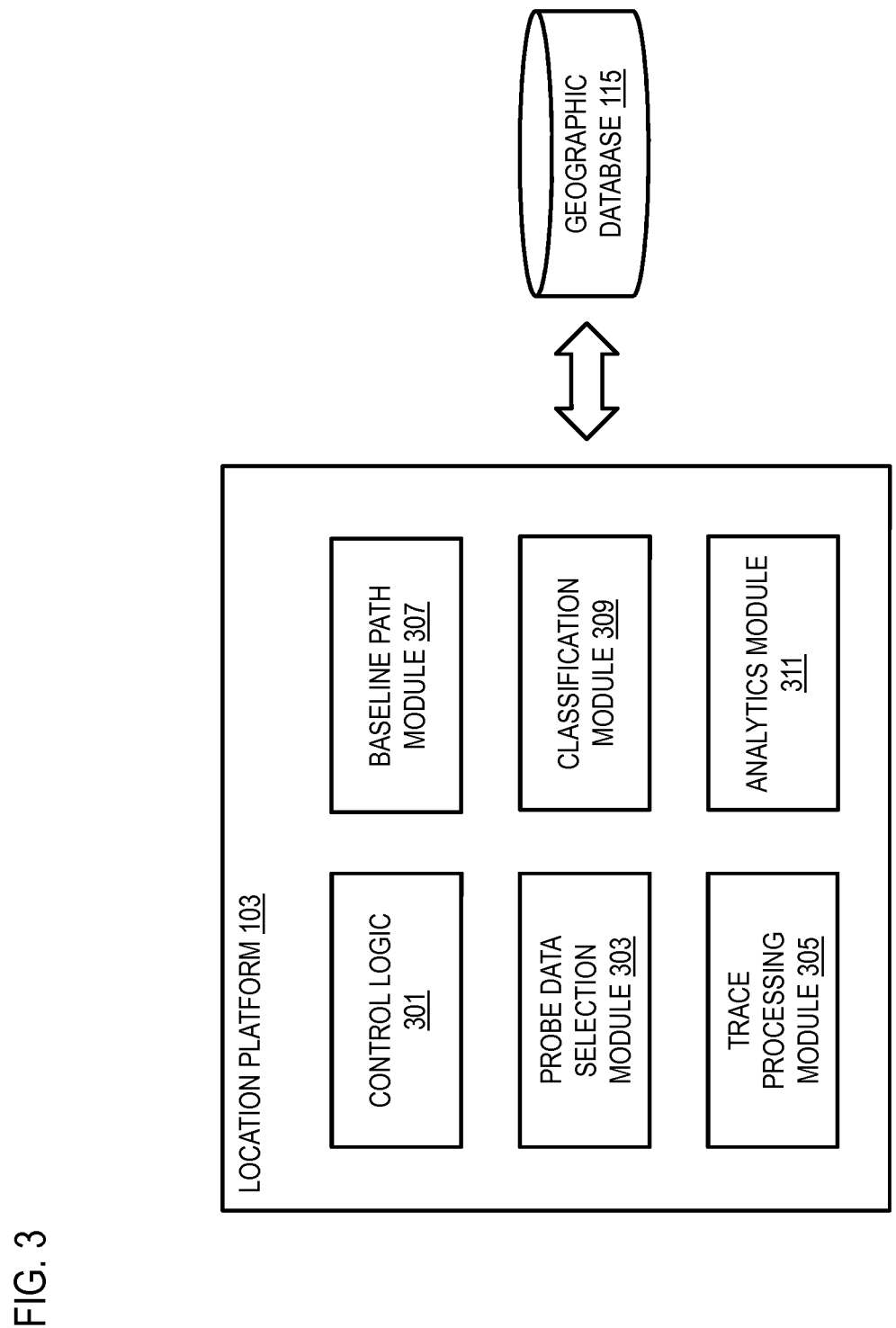
FIG. 3 is a diagram of components of a location platform, according to one embodiment.

FIG. 3 is a diagram of components of a location platform, according to one embodiment. By way of example, the location platform 103 includes one or more components for determining trajectory paths through a transportation structure of a road network. It is contemplated that the functions of these components may be combined in one or more components or performed by other components of equivalent functionality. In this embodiment, the location platform 103 includes a control logic 301, a probe data selection module 303, trace processing module 305, baseline path module 307, classification module 309, and analytics module 311.

As previously described, the location platform 103 takes as input a set of waypoints that describe where location paths or trajectory paths would god in a transportation structure (e.g., a highway interchange), along with a set of location data (e.g., probe data) collected around the structure or interchange. For example, the location platform 103 creates location paths for all the data in an area (e.g., a circular area) around the interchange center. The location platform 103 then classifies location paths that were likely to have traversed through the structure or interchange using only the location data and thus provide structure or interchange usage information.

In one embodiment, to perform these functions, the control logic 301 of the location platform 103 interacts with the probe data selection module 303 to select probe data appropriate for determining trajectory paths for a given transportation structure (e.g., a highway interchange). In one embodiment, the probe data selection module 303 identifies a reference point of the structure of interest (e.g., a center point of the structure or any other point specified by the location platform 103).

In this example, the structure of interest is a highway interchange. Accordingly, the probe data selection module 303 identifies the center of the interchange of interest. The probe data selection module 303 then identifies entry and exit points and a small area (e.g., a small circle) that spans the entrance and exit roads. In one embodiment, the small areas defined around the entrance and exit roads represent the area for performing a geospatial query for potentially matching location traces (e.g., location traces which fall within the defined small areas).

In one embodiment, for each entry or exit of the interchange, the probe data selection module 303 defines two way points in sequence along the road. This, for instance, allows for a greater probability of discovering trajectory paths that pass along the roadway without necessarily increasing the size the small defined areas spanning the entrance and exit roads. It is contemplated that probe data selection module can use any geometric shape to define the small area. For example, a small circle can be used, but a rectangular area or any other shaped area could be used instead to perform the geospatial query for probe data or location trace data.

In one embodiment, after identifying the center or other reference point of the structure or interchange, the probe data selection module 303 defines a data selection area originating from the reference point. For example, if using a circular area, a radius from the center of the interchange is defined based on the locations of the waypoints (e.g., the entry and exit points of the interchange). In one example, the further waypoint distance plus two times the waypoint circle is defined as the location for determining trajectory paths for the interchange. The radius or extent of the area is designed to capture the dynamics of the interchange while avoiding over-inclusion of probe data from nearby but unrelated transportation structures or transportation network segments. It is contemplated that the example of how to define the selection area radius or extend is for illustration only, and that the probe data selection module 303 can use any criteria or process for determining a data selection area.

Once the data selection area is defined, the probe data selection module 303 queries for all location points, location traces, or other probe data within the data selection area that span the transportation structure or interchange. This, for instance, results in capturing of all the location or trajectory paths in the available data set that are potentially relevant to the interchange.

After the obtaining the data, the probe data selection module 303 interacts with the trace processing module 305 to begin processing and/or clustering the location points based on their spatial relationship to the waypoints defined for the interchange or structure. For example, the trace processing module 305 finds all locations points that fall within the defined small areas associated with respective waypoints and clusters the location points by heading. In one embodiment, the trace processing module 305 then defines, for instance, the direction of travel of the largest cluster of location points as the direction of travel for the waypoint.

In one embodiment, the trace processing module 305 then collects the location points with the same direction of travel and that are in the waypoint circles or areas. The trace processing module 305 also collects the location traces and their associated probe sources that pass through the waypoint with the correct direction of travel (e.g., the direction of travel of the largest cluster). Location points that include the probe source and are connected in time are collected and ordered by time to create location paths or trajectory paths that pass through the waypoints. This, for instance, results in defining all location paths or trajectory paths that pass through the waypoint.

In one embodiment, the trace processing module 305 records the entrance waypoint and exit waypoint of each of the location paths. By way of example, an unknown status is recorded for entrance and exit points if none of the tracks pass directly through the respective small areas associated with the waypoints (e.g., the waypoint circles).

Once all of the location points within the data selection area for the structure or interchange have been processed, the trace processing module 305 interacts with the baseline path module 307 to determine one or more representative baseline paths through the structure or interchange. In one embodiment, the baseline path module 307 defines baseline location paths for combinations of entrance and exit waypoints for the structure or interchange. In one embodiment, the baseline location paths create or represent a map of the geometry of the structure or interchange.

In one embodiment, the baseline path module 307 applies selection criteria for location paths that have a defined entrance waypoint and exit waypoint with respect to the structure or interchange. For example, the baseline path module 307 may apply criteria such as (1) the location path having the most number or densest concentration of location points comprising the path; and/or (2) the location path having the most consistency of heading alignment with its waypoints. The criteria listed above are provided as illustration and not as limitations; and it is contemplated that any selection criteria for determining a representative baseline path from among the location paths, trajectory paths, location points, etc. associated with an interchange or transportation structure can be used.

After the baseline path module 307 defines the baseline paths that represent a map of the transportation structure or interchange of interest, the classification module 309 classifies the remaining location traces that were not specified as baseline paths. In many cases, the remaining location paths or traces have one or two of their entrance or exit waypoints labeled as "unknown." In one embodiment, the purpose of the classification by the classification module 309 is to find the closet match to the these location paths from among the baseline location paths that serve as "known" proxy location paths or trajectory paths through the transportation structure or interchange. As previously noted, in one embodiment, the defined baseline location paths serve as the proxy intersection map for classifying location traces through the structure or interchange, without need for map-matching to underlying map data about the structure or interchange.

In one embodiment, the classification module 309 cycles through location paths that have not been selected as baseline paths (e.g., location paths that have one or both endpoints as not being associated with an entrance or exit waypoint) and classifies them. For example, the classification module 309 passes every point from the unidentified location paths across every two points in the base location paths by, for instance, computing the line between the two base location path points, finding the distance of the unidentified location path point to the line computed from the baseline points, and comparing the headings of both location paths. If the distances computed for unidentified location path are below a threshold distance and the headings match then the base location path is a candidate match for the proxy base location path.

In one embodiment, location paths that do not meet the threshold limit are not included as interchange location paths. If more than one proxy base location paths are found, the classification module 309 reduces the maximum threshold distance criteria between locations paths and repeats the test again until one candidate proxy candidate remains. If the distances are below the threshold distance (e.g., a certain number meters) and the headings or directions of travel are aligned, the classification module 309 tags the unidentified location path with the base entry and exit of the remaining proxy candidate.

In one embodiment, following classification of the location traces or paths, the classification module 309 interacts with the analytics module 311 to process the classification results into a report to provide information on traffic through the transportation structure or interchange. By way of example, the information may include information on average times for maneuvers, traffic patterns, traffic flows, traffic volumes, etc. associated with the different trajectory paths traversing the interchange. For example, the analytics module 311 may calculate that the majority of traffic (e.g., 80%) stays on a first path rather than on an alternate path. This information can, for instance, be used by authorities to plan improvements or changes to existing road networks and the transportation structures contained thereof.

In one embodiment, the analytics module 311 can segment the probe data according to different contextual parameters such as temporal parameters (e.g., month, day of week, time of day, etc.), mode of transportation, type of vehicles, and the like. For example, the analytics module 311 may process the location traces to show that despite traffic volume differences, traffic patterns (e.g., percentage travelling certain paths) may remain relatively constant across seasons. The analyses discussed above are provide as examples and are not intended as limitations. It is contemplated that the analytical module 311 can be programmed or otherwise configured to generate any type of report or analyses of the determined location or trajectories paths.

Table 1 and Table 2 below are examples of analytical results generated by the analytics module 311. More specifically, Tables 1 and 2 show the average times for maneuvers though an interchange between a first highway (e.g., Highway 32 as shown in Table 1) and a second highway (e.g., Interstate 95 as shown in Table 2) as a function of time of day and day of week.

TABLE 1

Median Interchange Times for Highway 32

| Interchange Path | Month | Day of Week | Time of Day | Median (seconds) | Month | Day of Week | Time of Day | Median (seconds) |
|---|---|---|---|---|---|---|---|---|
| 32East-Enter, 32East-Exit | March | weekday | morning | 58 | August | weekday | morning | 53 |
| | | | evening | 56 | | | evening | 53 |
| | | | other | 56 | | | other | 53 |

TABLE 1-continued

Median Interchange Times for Highway 32

| Interchange Path | Month | Day of Week | Time of Day | Median (seconds) | Month | Day of Week | Time of Day | Median (seconds) |
|---|---|---|---|---|---|---|---|---|
| | | weekend | morning | 46.5 | | weekend | morning | 51 |
| | | | evening | 48 | | | evening | 51.5 |
| | | | other | 47 | | | other | 50 |
| 32East-Enter, 95North-Exit | March | weekday | morning | 60 | August | weekday | morning | 62 |
| | | | evening | 60 | | | evening | 62 |
| | | | other | 63 | | | other | 65 |
| | | weekend | morning | 54.5 | | weekend | morning | 60 |
| | | | evening | 60 | | | evening | 61 |
| | | | other | 61 | | | other | 61 |
| 32East-Enter, 95South-Exit | March | weekday | morning | 35.5 | August | weekday | morning | 45 |
| | | | evening | 35 | | | evening | 36 |
| | | | other | 36 | | | other | 40 |
| | | weekend | morning | 32 | | weekend | morning | 32 |
| | | | evening | 33 | | | evening | 35 |
| | | | other | 35 | | | other | 40 |
| 32West-Enter, 32West-Exit | March | weekday | morning | 52 | August | weekday | morning | 47 |
| | | | evening | 47 | | | evening | 50 |
| | | | other | 49.5 | | | other | 51 |
| | | weekend | morning | 45 | | weekend | morning | 44.5 |
| | | | evening | 45 | | | evening | 50 |
| | | | other | 45 | | | other | 44 |
| 32West-Enter, 95North-Exit | March | weekday | morning | 56.5 | August | weekday | morning | 60 |
| | | | evening | 45 | | | evening | 43 |
| | | | other | 48 | | | other | 52 |
| | | weekend | morning | 46 | | weekend | morning | 43 |
| | | | evening | 47 | | | evening | 43 |
| | | | other | 46 | | | other | 44 |
| 32West-Enter, 95South-Exit | March | weekday | morning | 60 | August | weekday | morning | 60 |
| | | | evening | 60 | | | evening | 60 |
| | | | other | 60 | | | other | 61 |
| | | weekend | morning | 61 | | weekend | morning | 63 |
| | | | evening | 62.5 | | | evening | 62 |
| | | | other | 60 | | | other | 74 |

TABLE 2

Median Interchange Times for Interstate 95

| Interchange Path | Month | Day of Week | Time of Day | Median (seconds) | Month | Day of Week | Time of Day | Median (seconds) |
|---|---|---|---|---|---|---|---|---|
| 95North-Enter, 95North-Exit | March | weekday | morning | 50 | August | weekday | morning | 50 |
| | | | evening | 46 | | | evening | 50 |
| | | | other | 53 | | | other | 54 |
| | | weekend | morning | 45 | | weekend | morning | 45 |
| | | | evening | 47 | | | evening | 45 |
| | | | other | 46 | | | other | 47 |
| 95North-Enter, 32East-Exit | March | weekday | morning | 60 | August | weekday | morning | 60 |
| | | | evening | 47 | | | evening | 43 |
| | | | other | 47 | | | other | 45 |
| | | weekend | morning | 45 | | weekend | morning | 41.5 |
| | | | evening | 40 | | | evening | 42 |
| | | | other | 43 | | | other | 42 |
| 95North-Enter, 32West-Exit | March | weekday | morning | 90 | August | weekday | morning | 94 |
| | | | evening | 90 | | | evening | 90 |
| | | | other | 91.5 | | | other | 94 |
| | | weekend | morning | 86 | | weekend | morning | 90 |
| | | | evening | 88 | | | evening | 90 |
| | | | other | 90 | | | other | 90 |
| 95South-Enter, 95South-Exit | March | weekday | morning | 46 | August | weekday | morning | 46 |
| | | | evening | 45 | | | evening | 43 |
| | | | other | 45 | | | other | 45 |

TABLE 2-continued

Median Interchange Times for Interstate 95

| Interchange Path | Month | Day of Week | Time of Day | Median (seconds) | Month | Day of Week | Time of Day | Median (seconds) |
|---|---|---|---|---|---|---|---|---|
| | | weekend | morning | 43 | | weekend | morning | 42 |
| | | | evening | 45 | | | evening | 42 |
| | | | other | 45 | | | other | 42 |
| 95South-Enter, 32East-Exit | March | weekday | morning | 114 | August | weekday | morning | 96 |
| | | | evening | 90 | | | evening | 90 |
| | | | other | 92 | | | other | 95 |
| | | weekend | morning | 90 | | weekend | morning | 90 |
| | | | evening | 90 | | | evening | 90 |
| | | | other | 91 | | | other | 96.5 |
| 95South-Enter, 32West-Exit | March | weekday | morning | 45 | August | weekday | morning | 49 |
| | | | evening | 37 | | | evening | 40 |
| | | | other | 37.5 | | | other | 41 |
| | | weekend | morning | 34 | | weekend | morning | 40 |
| | | | evening | 33 | | | evening | 40.5 |
| | | | Other | 37 | | | other | 40 |

Figure 4:
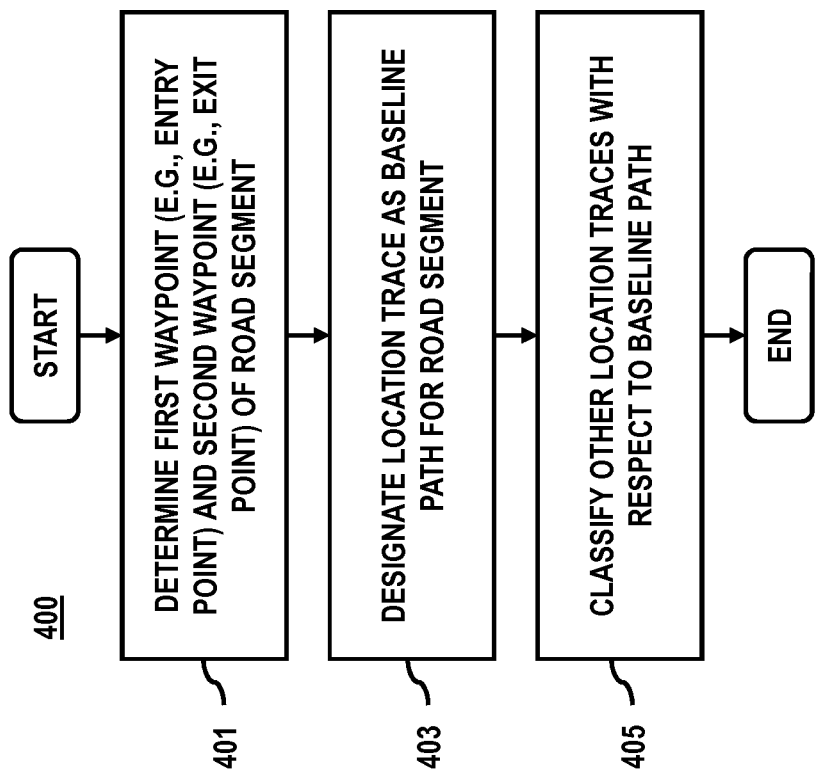
FIG. 4 is a flowchart of a process for determining trajectory paths for a road network, according to one embodiment.
Figure 12:
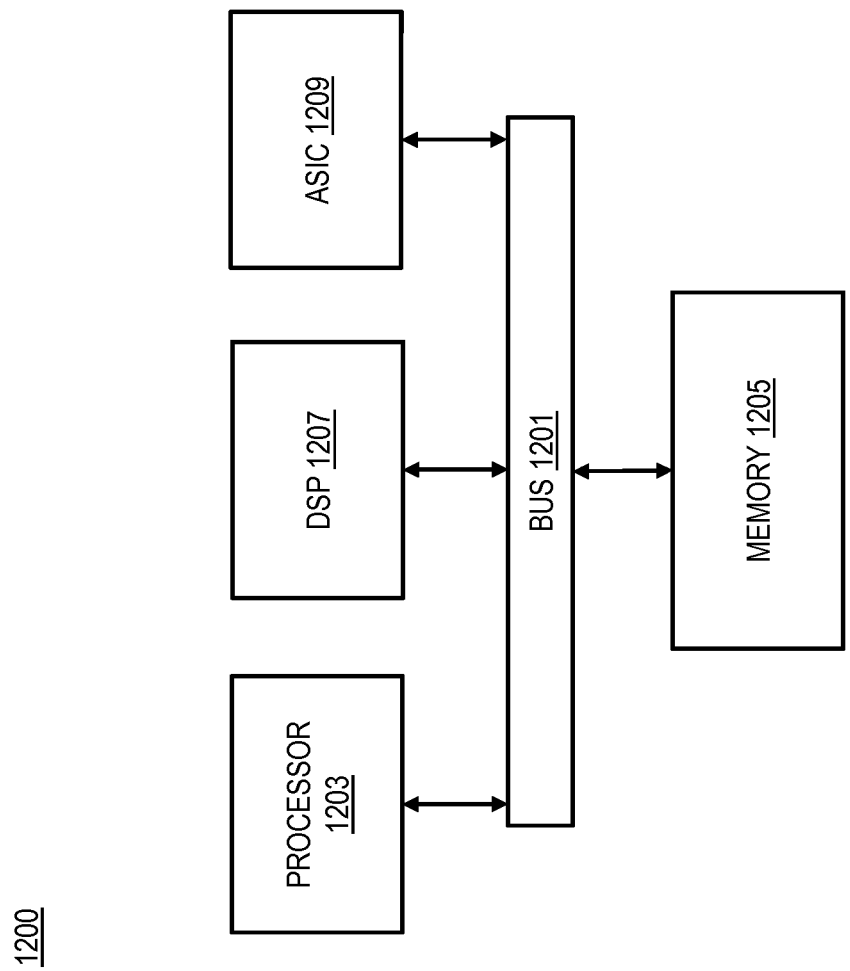
FIG. 12 is a diagram of a chip set that can be used to implement an embodiment of the invention.

FIG. 4 is a flowchart of a process for determining trajectory paths for a road network, according to one embodiment. In one embodiment, the location platform 103 performs the process 400 and is implemented in, for instance, a chip set including a processor and a memory as shown in FIG. 12. In addition or alternatively, the location application 113 can perform all or a portion of the process 400.

In step 401, the location platform 103 determines at least one first waypoint and at least one second waypoint of at least one road structure. In one embodiment, the at least one road structure is an interchange or other transportation structure in a road network. In one embodiment, the at least one first waypoint represents at least one entry point to the at least one road structure, and wherein the at least one second waypoint represents at least one exit point from the at least one road structure. As previously discussed, the location platform 103 relies on a minimal knowledge of the geometry of a structure or interchange. In this embodiment, the location platform 103 uses knowledge of only the entry and exit points of an interchange to determine the underlying trajectory paths traversing the structure. Accordingly, the location platform 103 does not use map-matching of location paths against map data to understand the underlying geometry of a structure.

Instead, as shown in step 403, the location platform 103 causes, at least in part, a designation of at least one location trace spanning the at least one first waypoint and the at least one second waypoint as at least one baseline path. In one embodiment, the at least one baseline path serves as a proxy representation of the geometry of structure of interchange of interest. In other words, the location platform 103 causes, at least in part, a designation of the at least one baseline path as a proxy for map data representing the at least one road structure.

In one embodiment, the designation of the at least one location trace as the at least one baseline path is based on at least one of: a number of location points in the at least in the at least one location trace; and a consistency of a heading alignment of the location points with respect to the at least one first waypoint, the at least one second waypoint or a combination thereof. As previously discussed, the location platform 103 can also use any other criterion for selecting which location trace is most representative of the trajectory paths of a structure or interchange.

In step 405, the location platform 103 causes, at least in part, a classification of one or more other location traces with respect to the at least one baseline path. By way of example, the location platform 103 can best maximize the utility of available location trace data for a given interchange by dynamically classifying the available location traces against the proxy baseline location paths. In this way, even if an interchange's physical configuration is changed, the location platform 103 can still adaptively make use of the data. This adaptive process also advantageously avoids a need to archive or store map data over a period of time so that the correct map data can be matched against the probe data collected during the same period, when the interchange is reconfigured, added, or other modified over time.

Figure 5:
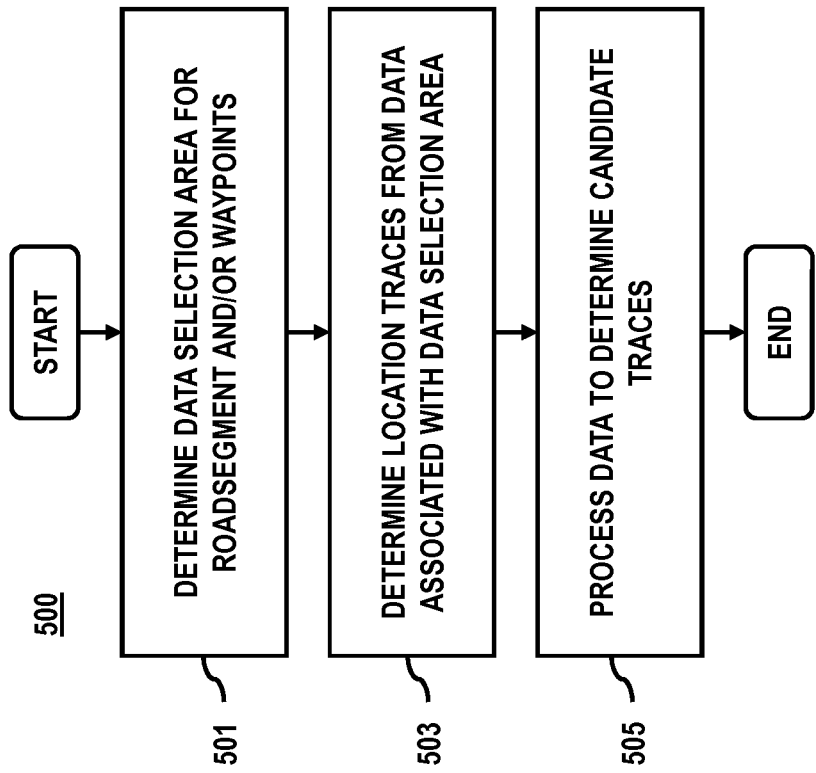
FIG. 5 is a flowchart of a process for selecting data to determining trajectory paths for a road network, according to one embodiment.

FIG. 5 is a flowchart of a process for selecting data to determining trajectory paths for a road network, according to one embodiment. In one embodiment, the location platform 103 performs the process 500 and is implemented in, for instance, a chip set including a processor and a memory as shown in FIG. 12. In addition or alternatively, the location application 113 can perform all or a portion of the process 500. In one embodiment, the process 500 can be performed to provide data for processing as described with respect to the process 400 of FIG. 4.

In step 501, the location platform 103 determines at least one data selection area encompassing at least one road structure, at least one first waypoint of the structure (e.g., an entrance point), at least one second waypoint of the structure (e.g., an exit point), or a combination thereof based, at least in part, on one or more proximity criteria. In one embodiment, the location platform 102 uses the proximity criteria to select location data that is likely to be relevant to a given structure or interchange, and thereby, reduce the need to process potentially irrelevant data.

More specifically, the at least one data selection area represents a parameter for performing a geospatial query of available location data to retrieve potentially relevant data. In one embodiment, the proximity criteria may describe geometric parameters for indicating a bounded area from which to retrieve location or probe data. For example, as previously described, the proximity criteria may include specifying a reference point (e.g., a center point) of a structure or interchange and then a rule for determining a radius or extent of the data selection area originating from the reference point. It is noted that the use of a reference point and rule for determining an extent is only one example for describing a selection area. It is contemplated that other means for defining a data selection area can be used including, manual selection, application of a template shapes, historical analysis, selection algorithms, etc.

In step 503, the location platform 103 determines or retrieves location traces (e.g., the at least one location trace that can be designated as a baseline path, the one or more other location traces that are to be classified, or a combination thereof) from probe data, sensor data, or a combination thereof collected from within the at least one data selection area.

In step 505, the location platform 103 processes and/or facilitates a processing of the probe data, the sensor data, or a combination thereof to determine one or more candidate baseline traces, one or more candidate non-baseline traces, or a combination thereof. In one embodiment, both endpoints of the one or more candidate baseline traces include at the at least one first waypoint (e.g., an entrance point) or at least one second waypoint (e.g., an exit point). In one embodiment, one or both endpoints of the one or more candidate non-baseline do not include the at least one first waypoint or the at least one second waypoint. In other words, the location platform 103 selects it's baseline paths from location traces that span both entrance and exit waypoints of a potential path, while all other location traces (e.g., those with no waypoint or only one waypoint) as well as those traces with two waypoints that were not selected as baseline paths can be classified against the designated baseline paths serving as a proxy for the geometry of the structure or interchange of interest.

For example, in one embodiment, the location platform 103 determines the at least one location trace from among the one or more candidate baseline traces. In one embodiment, the location platform 103 determines the one or more other location traces from among the one or more candidate non-baseline traces.

Figure 6:
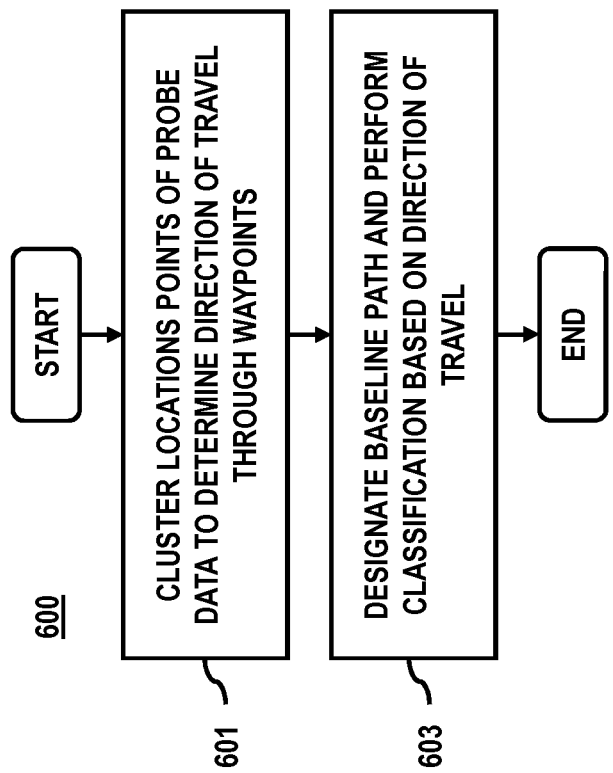
FIG. 6 is a flowchart of a process for clustering data to determine direction of travel, according to one embodiment.

FIG. 6 is a flowchart of a process for clustering data to determine direction of travel, according to one embodiment. In one embodiment, the location platform 103 performs the process 600 and is implemented in, for instance, a chip set including a processor and a memory as shown in FIG. 12. In addition or alternatively, the location application 113 can perform all or a portion of the process 600. In one embodiment, the location platform 103 performs the process 600 as part of the process for selecting baseline paths and deriving the underlying geometry of a transportation/road structure or interchange. Accordingly, the process 600 assumes that the location platform 103 has obtained a set of location traces or probe data that are associated with a structure of interest. It is also assumed that the location platform 103 has identified at least one first waypoint (e.g., an entrance point) and at least on second waypoint (e.g., an exit point) associated with potential paths through a structure.

In step 601, the location platform 103 causes, at least in part, a clustering of one or more locations points of probe data, sensor data, or a combination thereof (e.g., associated with the structure of interest) to determine at least one direction travel through the at least one first waypoint (e.g., entrance point), the at least one second waypoint (e.g., exit point), or a combination thereof. In one embodiment, understanding direction of travel enables the location platform 103 to better differentiate location traces that can potentially overlap when traversing complex structures such as highway interchanges. For example, even if two paths appear to substantially overlap, the location platform 103 can potentially differentiate the path by looking at differences in heading or direction of travel.

Accordingly, in step 603, the location platform 103 designates at least one location trace as a baseline path, performs a classification of other location traces, or combination thereof is based, at least in part, on the at least one direction of travel determined for the traces.

Figure 7:
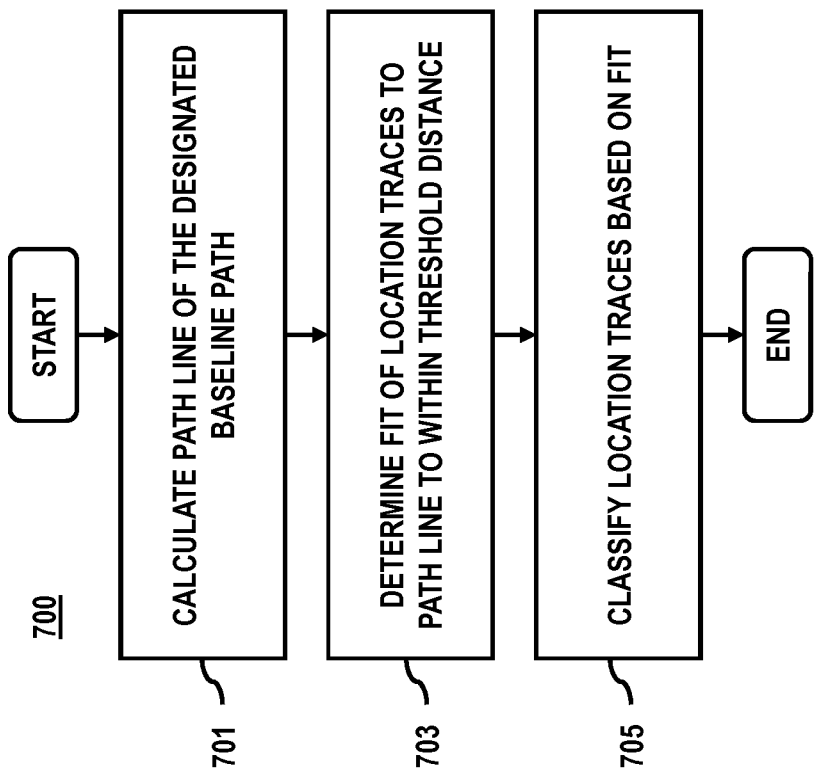
FIG. 7 is a flowchart of a process for classifying location traces against baseline paths, according to one embodiment.

FIG. 7 is a flowchart of a process for classifying location traces against baseline paths, according to one embodiment. In one embodiment, the location platform 103 performs the process 700 and is implemented in, for instance, a chip set including a processor and a memory as shown in FIG. 12. In addition or alternatively, the location application 113 can perform all or a portion of the process 700. The process 700 depicts an example process for classifying unknown location traces against baseline paths that have the defined to represent the geometry of a given structure or interchange.

In step 701, the location platform 103 causes, at least in part, a calculation of at least one path line of the at least one baseline path. For example, the location platform 103 can sample two or more location points of a location trace that has been designated as a baseline path for structure. The location platform 103 then calculates a path line or curve based on those two points.

In step 703, the location platform 103 determines a fit of the one or more other location traces (e.g., unknown location traces) to the at least one path line to within one or more threshold distance values. For example, the location platform 103 selects one or more location points from the unknown location trace (e.g., the one or more location points closest to the two or more points selected to calculate the path line). The location platform 103 then calculates a distance of the selected location point(s) from the computed path line.

In step 705, the location platform 103 performs the classification of the one or more other location traces is based, at least in part, on the fit. For example, the distance from the unknown location point to the path line is then compared to a maximum distance threshold. If the distance is less than the threshold, then the proxy baseline under evaluation or associated with the threshold represents a potential match for the unknown location trace.

In one embodiment, if more than one of the one or more threshold distance values are satisfied (e.g., for multiple proxy baselines), the location platform 103 causes, at least in part, a decrease of the one or more threshold distance values. The location platform 103 then causes, a redetermination of the fit based, at least in part, on the decreased one or more threshold distance values. In other words, the location platform 103 can recursively decrease the threshold values until only one baseline location path matches the unknown location trace. When there is only one match, the unknown location trace is classified accordingly.

Figure 8:
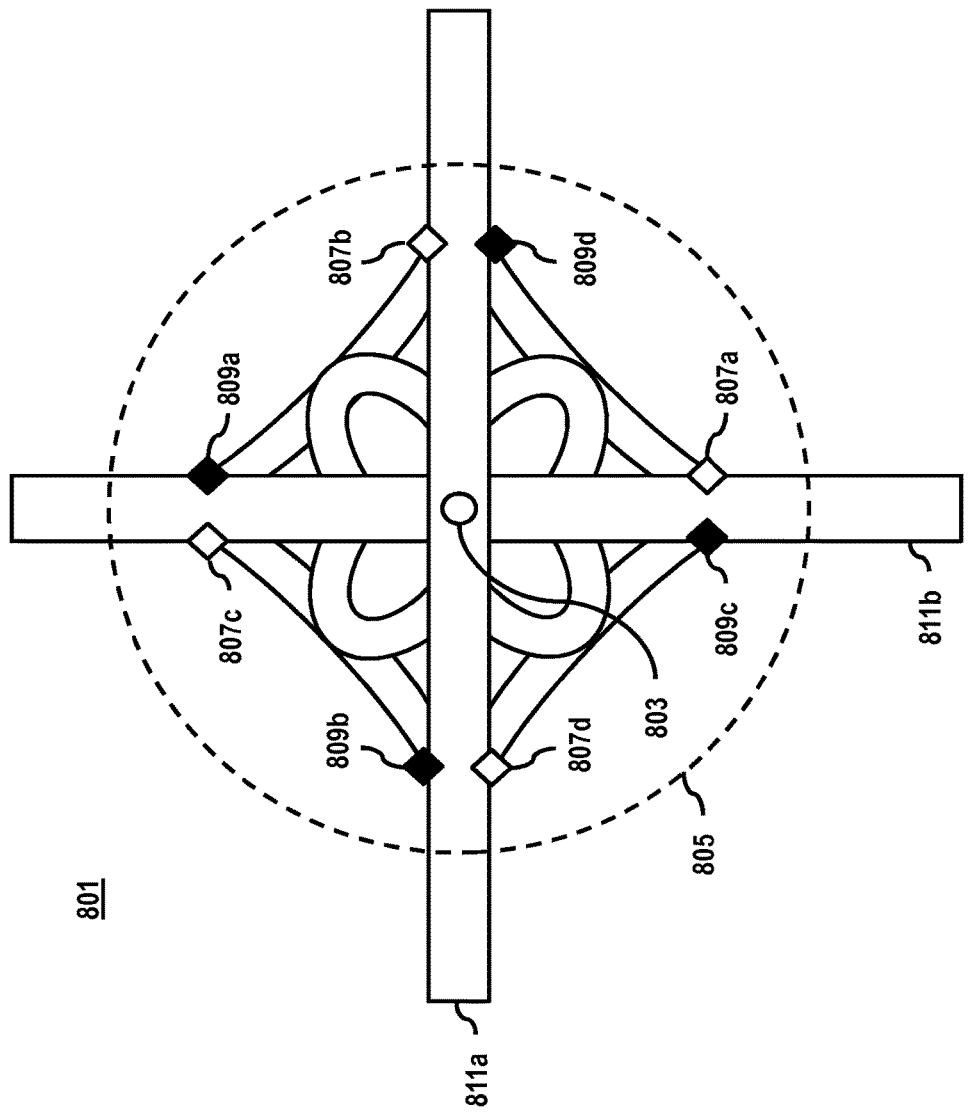
FIG. 8 is a diagram depicting a road structure with entry points and exit points, according to one embodiment.

FIG. 8 is a diagram depicting a road structure with entry points and exit points, according to one embodiment. In the example of FIG. 8, the road structure of interest is a highway interchange 801. The location platform 103 has designated a reference point 803 (e.g., a center point) for the highway interchange 801. Based on the reference point, the location platform 103 identifies a data selection area 805 (e.g., a circular area) described by a radius originating from the reference point 803. The data selection area 805 has been selected to encompass the waypoints identified for the highway interchange 801. For example, entry waypoints 807a-807d and exit waypoints 809a-809d are depicted. These waypoints represent entry and exit points to highway 811a and highway 811b comprising the interchange.

As previously discussed, the waypoints 807a-809d and 809a-809d are the geometric points from which the location platform 103 determines trajectory paths traversing the highway interchange 801. In addition, the data selection area 805 represents a parameter for performing a geospatial query to retrieve probe or location data for constructing the trajectory paths.

FIGS. 9A-9D depict baseline paths determined for a road structure, according to various embodiments. In the examples of FIGS. 9A-9D, the location platform 103 has processed the location or probe data associated with the data selection area 805 of FIG. 8 to designate various location traces as baseline traces that represent the geometry of the highway interchange 801 for the perspective of entry waypoint 807a. For illustration, only the baseline paths originating from entry waypoint 807a are depicted in FIGS. 9A-9D. However, the location platform 103 is capable of calculating baseline paths from any entry waypoint (e.g., 807a-807d) to any other exit waypoint (e.g., 809a-809d) within a structure of interest.

Figure 9A:
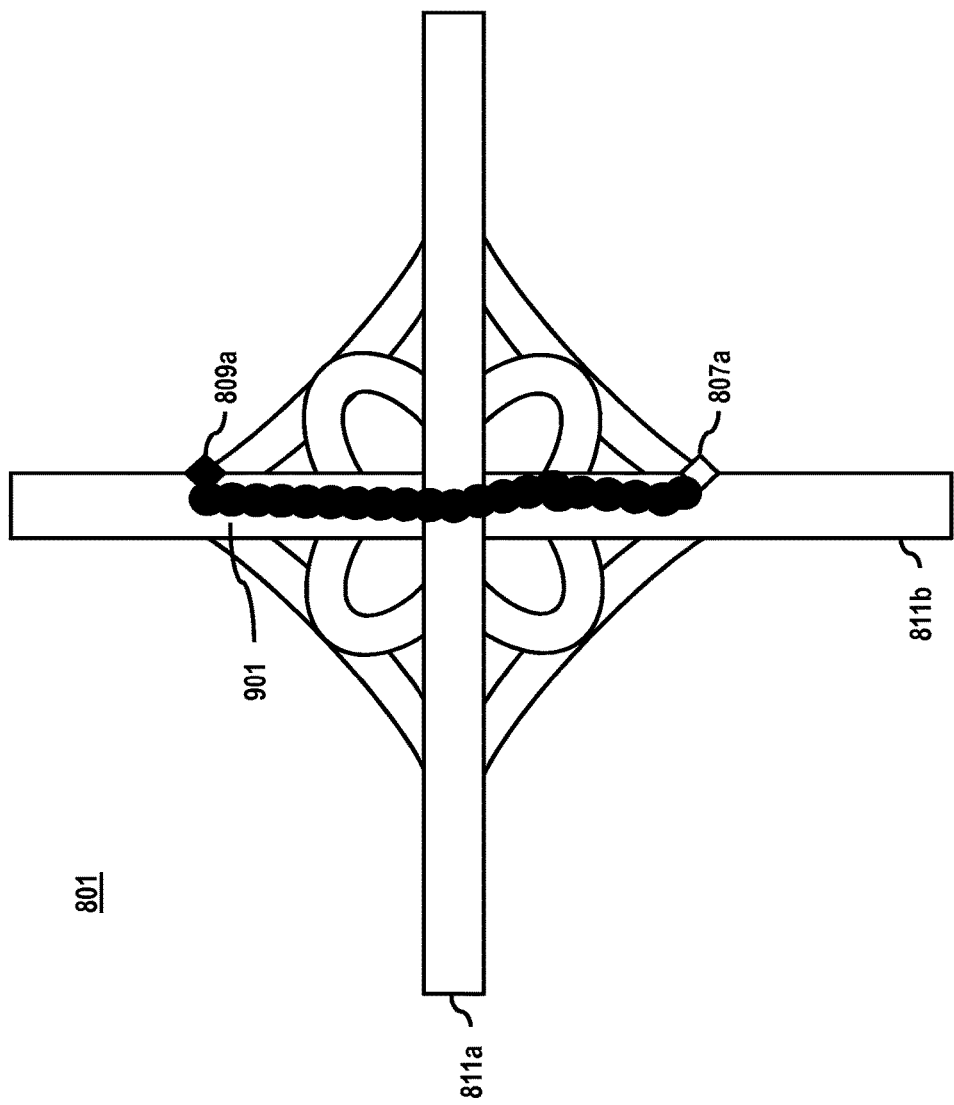

FIG. 9A depicts a baseline path 901 from entry waypoint 807a and ending at exit waypoint 809a. As previously describe, the location platform 103 selects the baseline path from candidate location traces that span the entry waypoint 807a and the exit waypoint 809a. The baseline path 901 consists of individual location points as indicated by the dotted appearance of the baseline path 901. The location points are depicted in their actual physical locations. Because the location platform 103 generally selects the most dense (e.g., with the most number of location points) location trace and most consistent with the heading of the waypoints, the depicted baseline path 901 is also relatively dense.

Figure 9C:
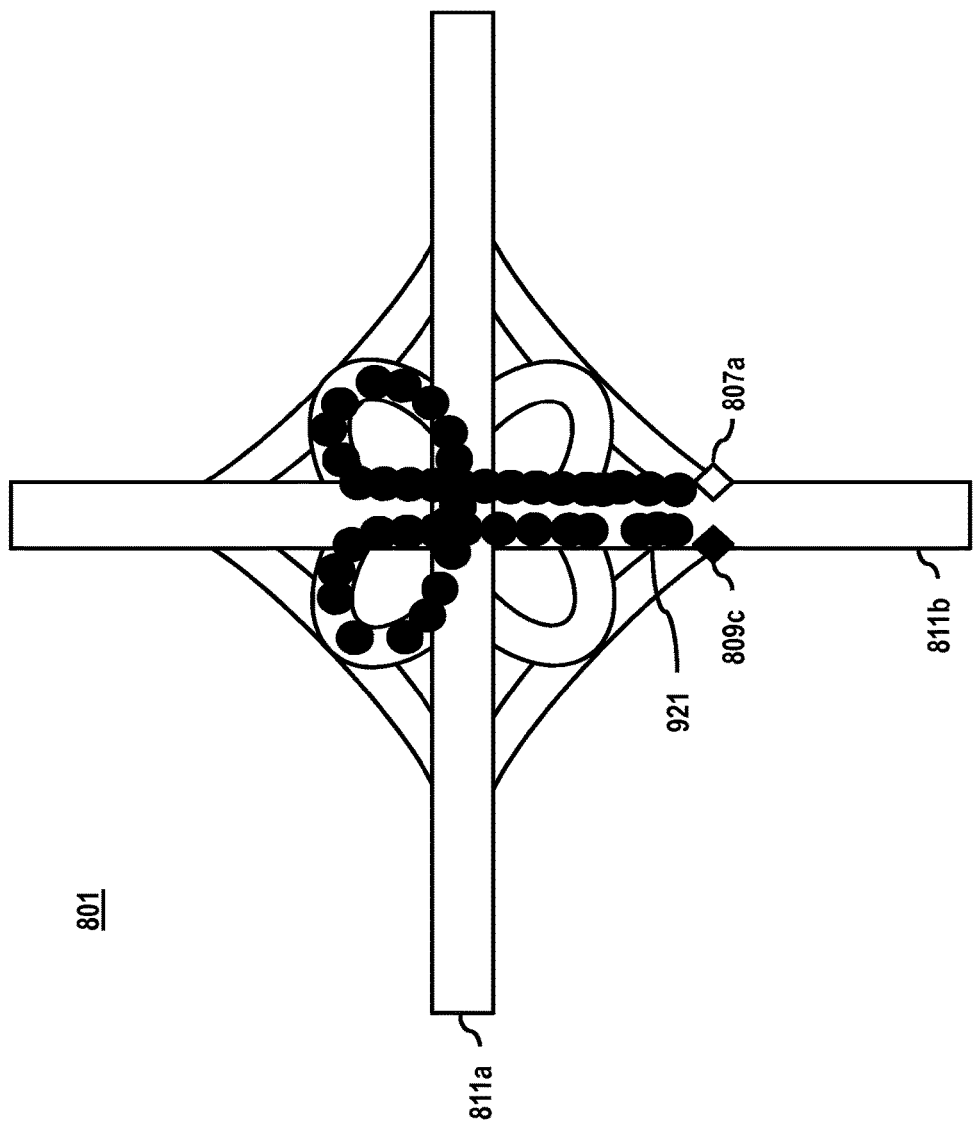
Figure 9D:
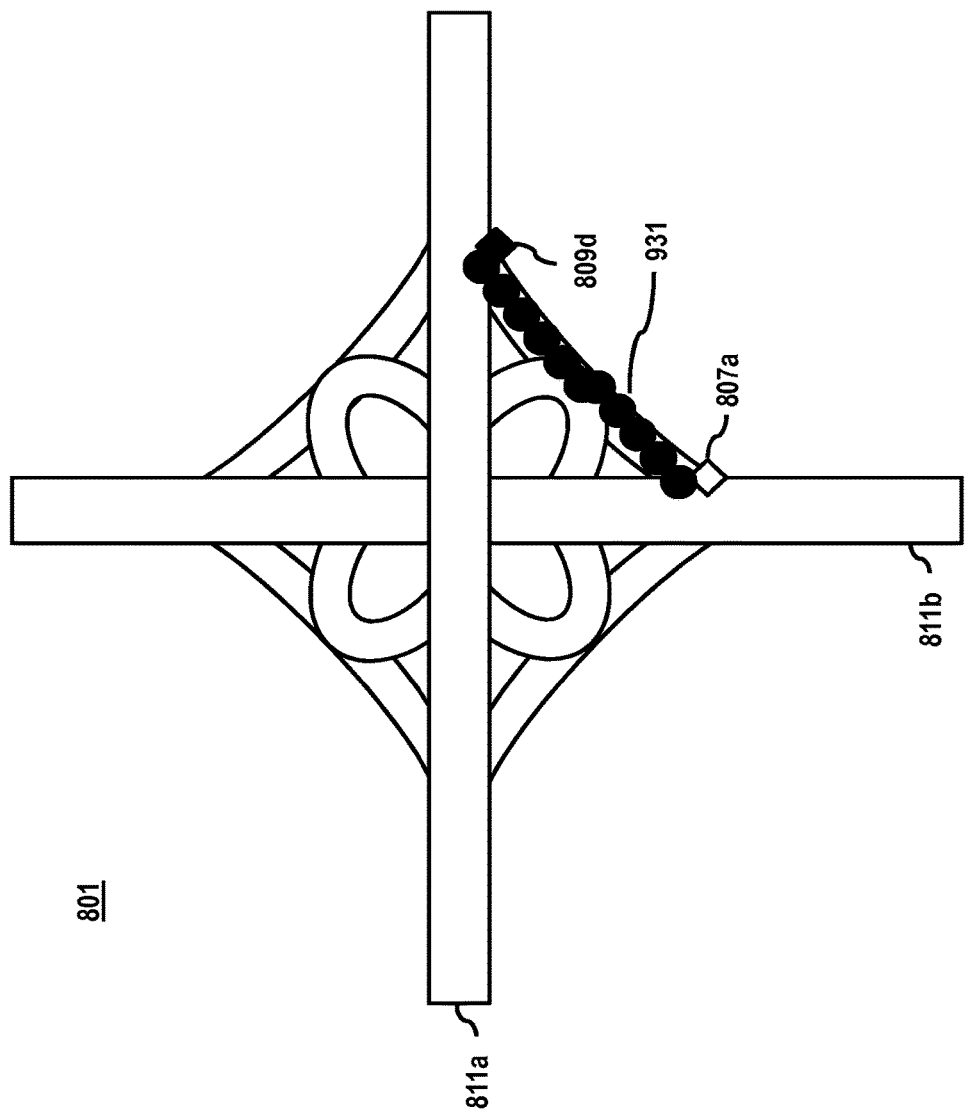

Similarly, FIG. 9B depicts a baseline path 911 from entry waypoint 807a to exit waypoint 908b. FIG. 9C depicts a baseline path 921 from entry waypoint 807a to exit waypoint 908c. FIG. 9D depicts a baseline path 931 from entry waypoint 807a to exit waypoint 908d.

FIG. 10A-10D depict classification results for example location traces, according to various embodiments. The examples of FIG. 10A-10D illustrate classification results generated by the location platform 103. In one embodiment, the location platform 103 classifies unknown location traces by determining a best match or fit against the baseline paths that represent the geometry of the highway structure 801. The baseline paths (e.g., baseline paths 901, 911, 921, and 931 of FIGS. 9A-9B) are depicted in each of the FIGS. 10A-10D next to the unknown paths that were classified as matches.

Figure 10A:
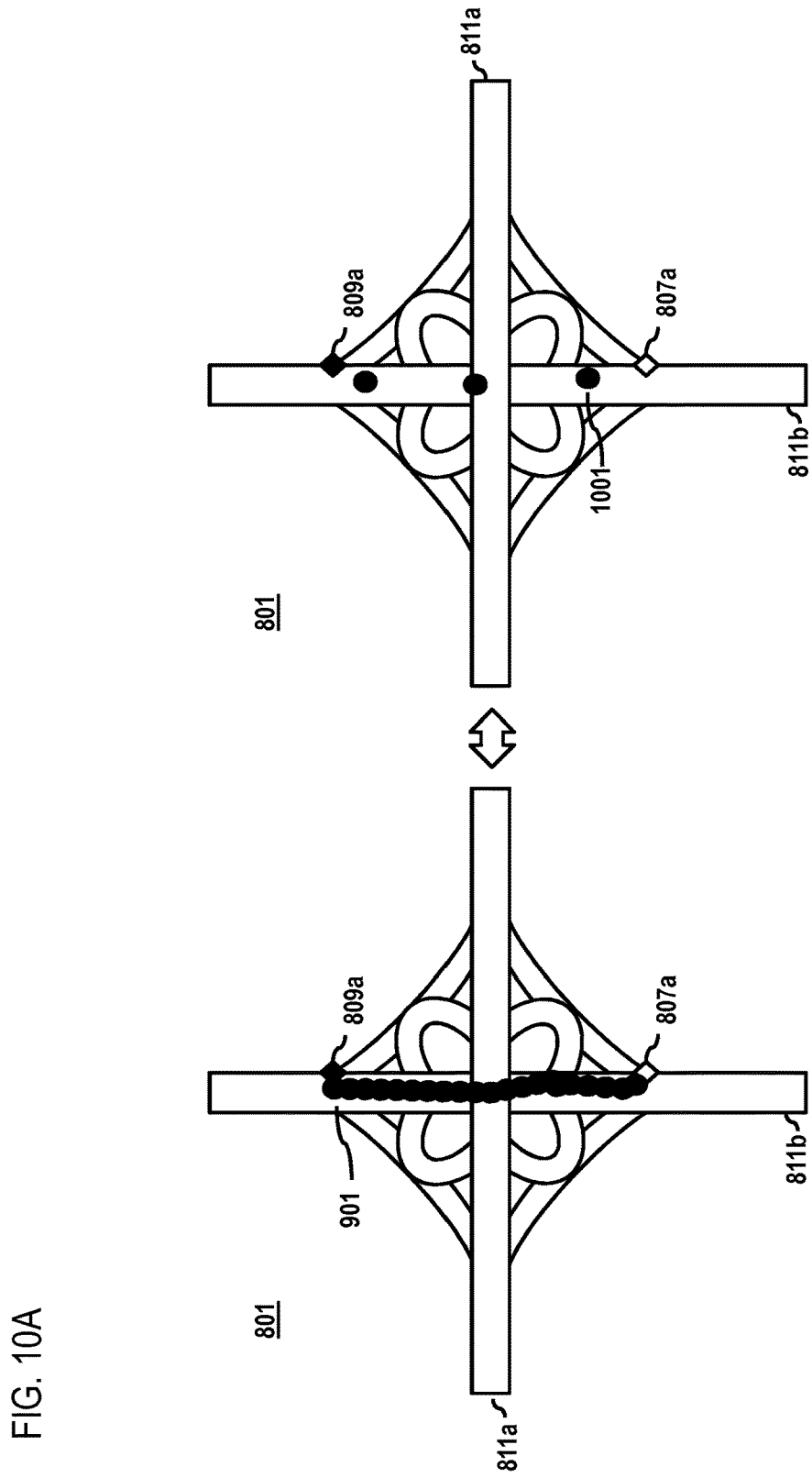

As shown in FIG. 10A, the baseline path 901 was matched to the unknown trace 1001 (e.g., using the path line fit process previously described). In this example, the unknown trace 1001 is relatively sparse in location points, but nonetheless the location platform 103 is able to best match the location points to fit baseline 901, thereby enabling the location platform 103 that platform to make use of the sparse unknown trace 1001 when other traditional approaches may not have been able to make a match.

Figure 10B:
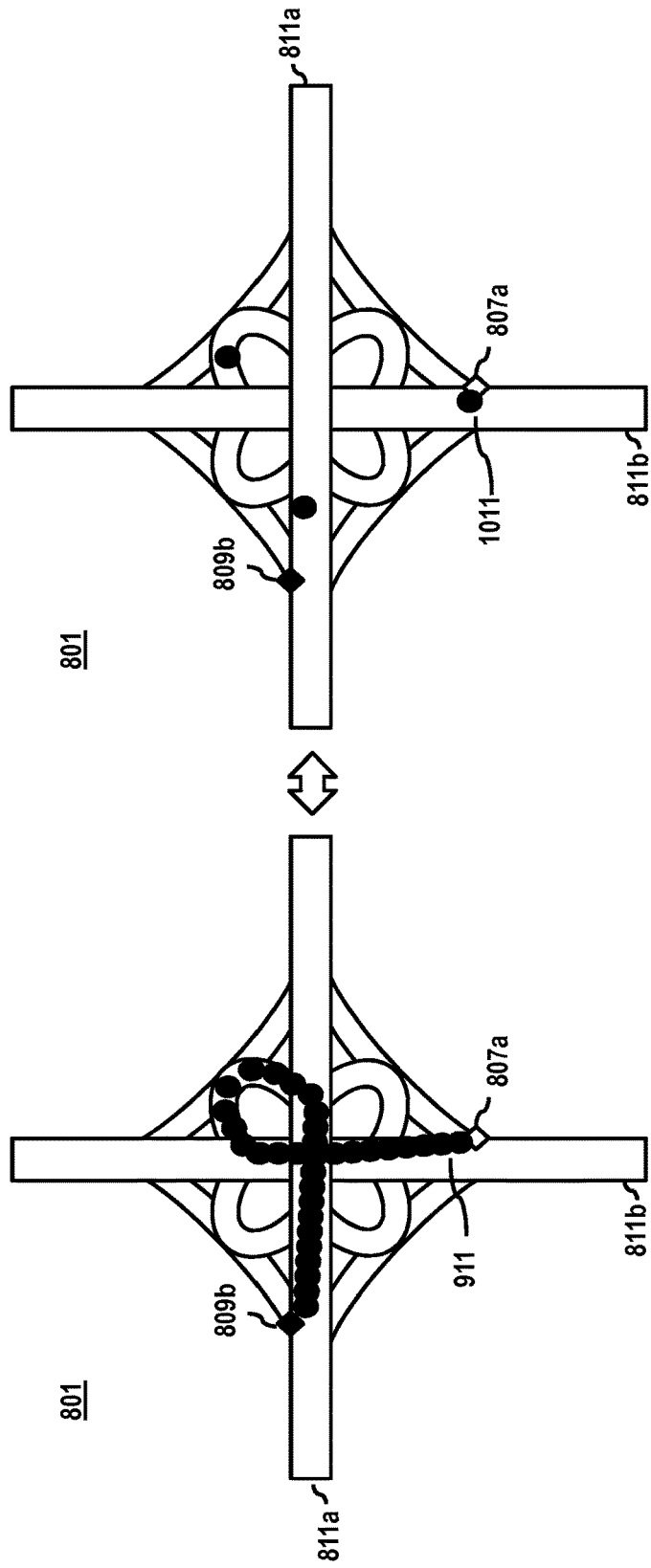
Figure 10C:
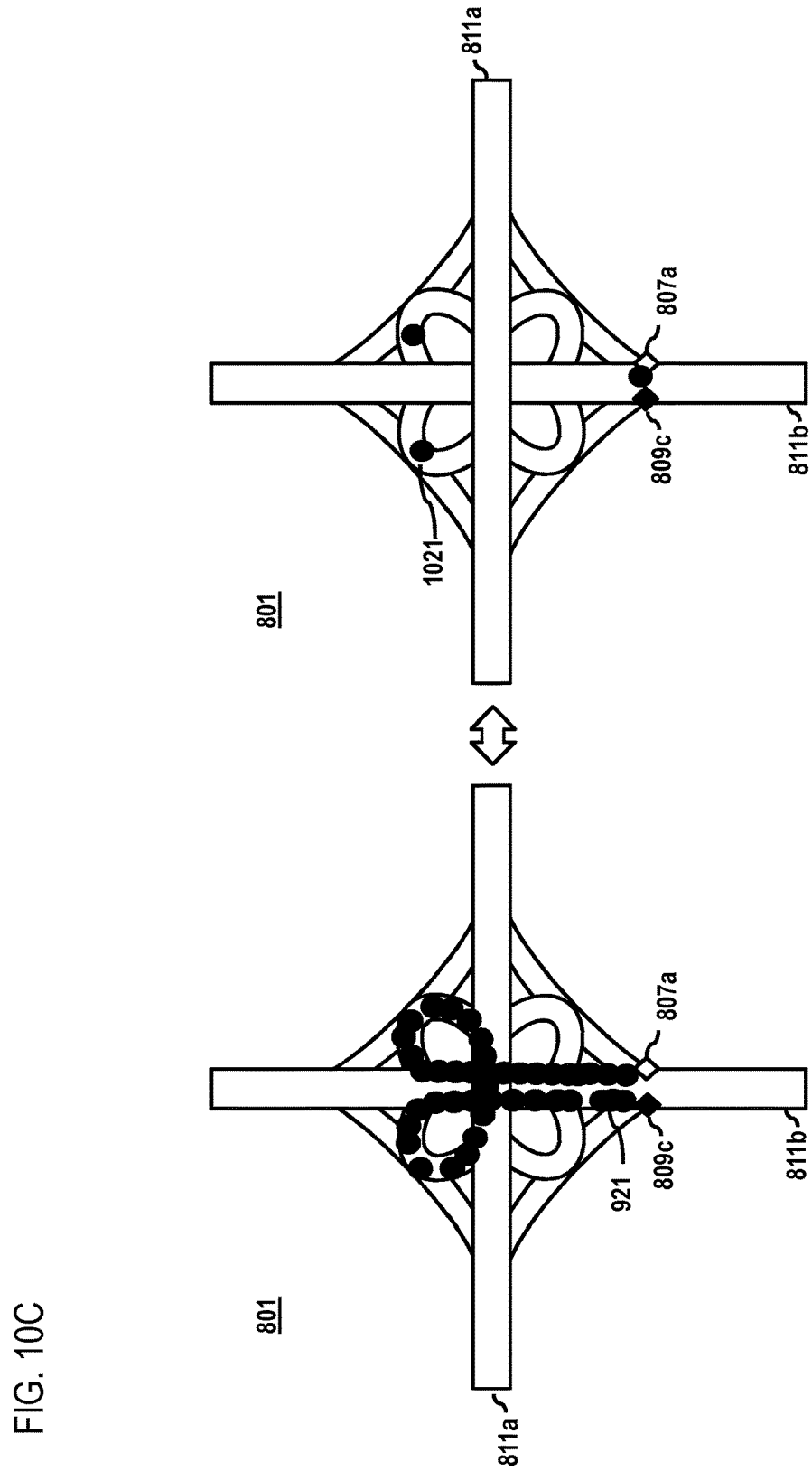

Similarly, FIG. 10B depicts matching of sparse unknown trace 1011 against baseline path 911. FIG. 10C depicts matching of sparse unknown trace 1021 against baseline path 921. FIG. 10D depicts matching of sparse unknown trace 1031 against baseline path 931.

The processes described herein for determining trajectory paths in a road network may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
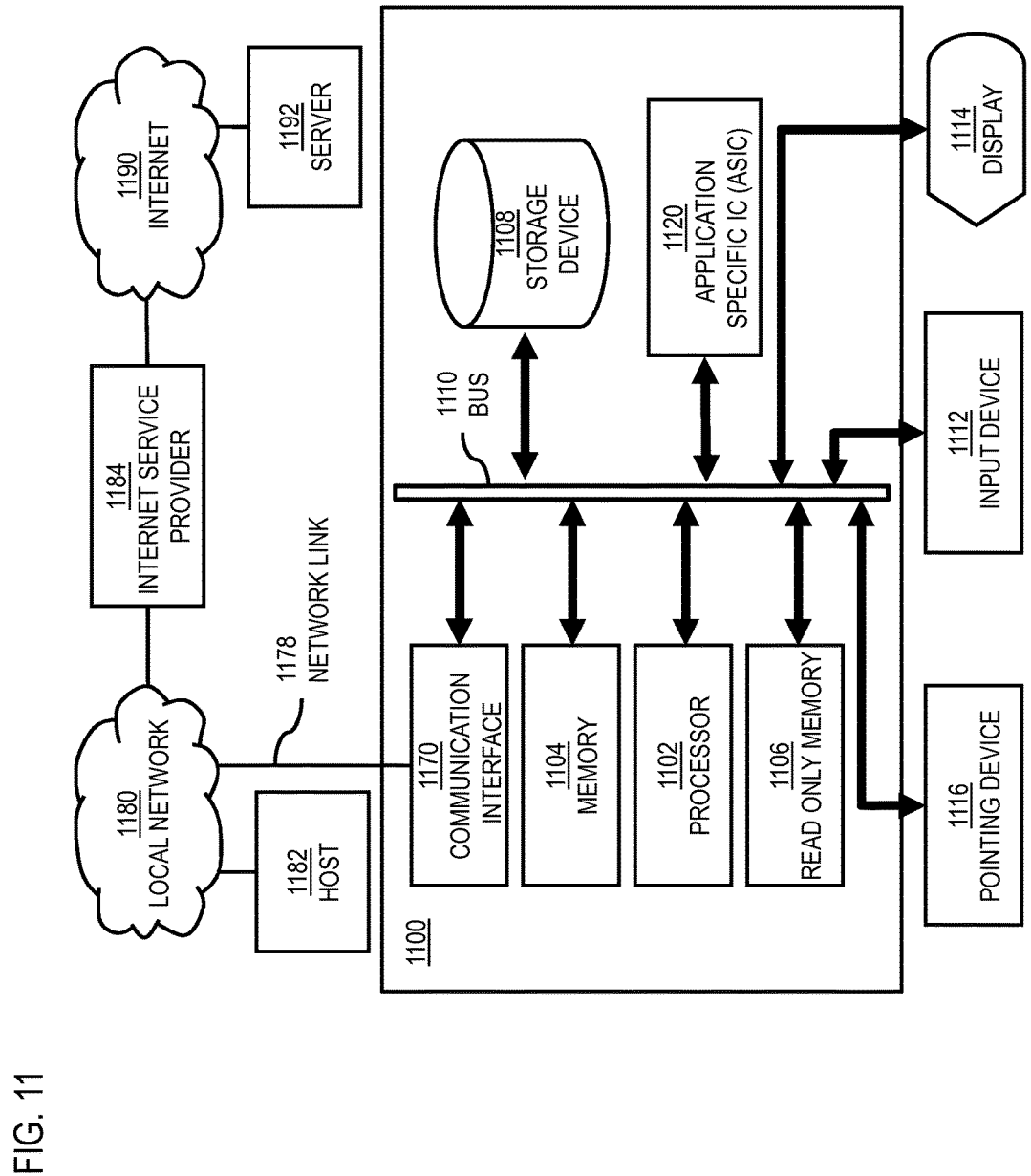
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to determine trajectory paths in a road network as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of determining trajectory paths in a road network.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to determining trajectory paths in a road network. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for determining trajectory paths in a road network. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining trajectory paths in a road network, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for determining trajectory paths in a road network.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to determine trajectory paths in a road network as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of determining trajectory paths in a road network.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine trajectory paths in a road network. The memory 1205 also stores the data associated with or generated by the execution of the inventive steps.

Figure 13:
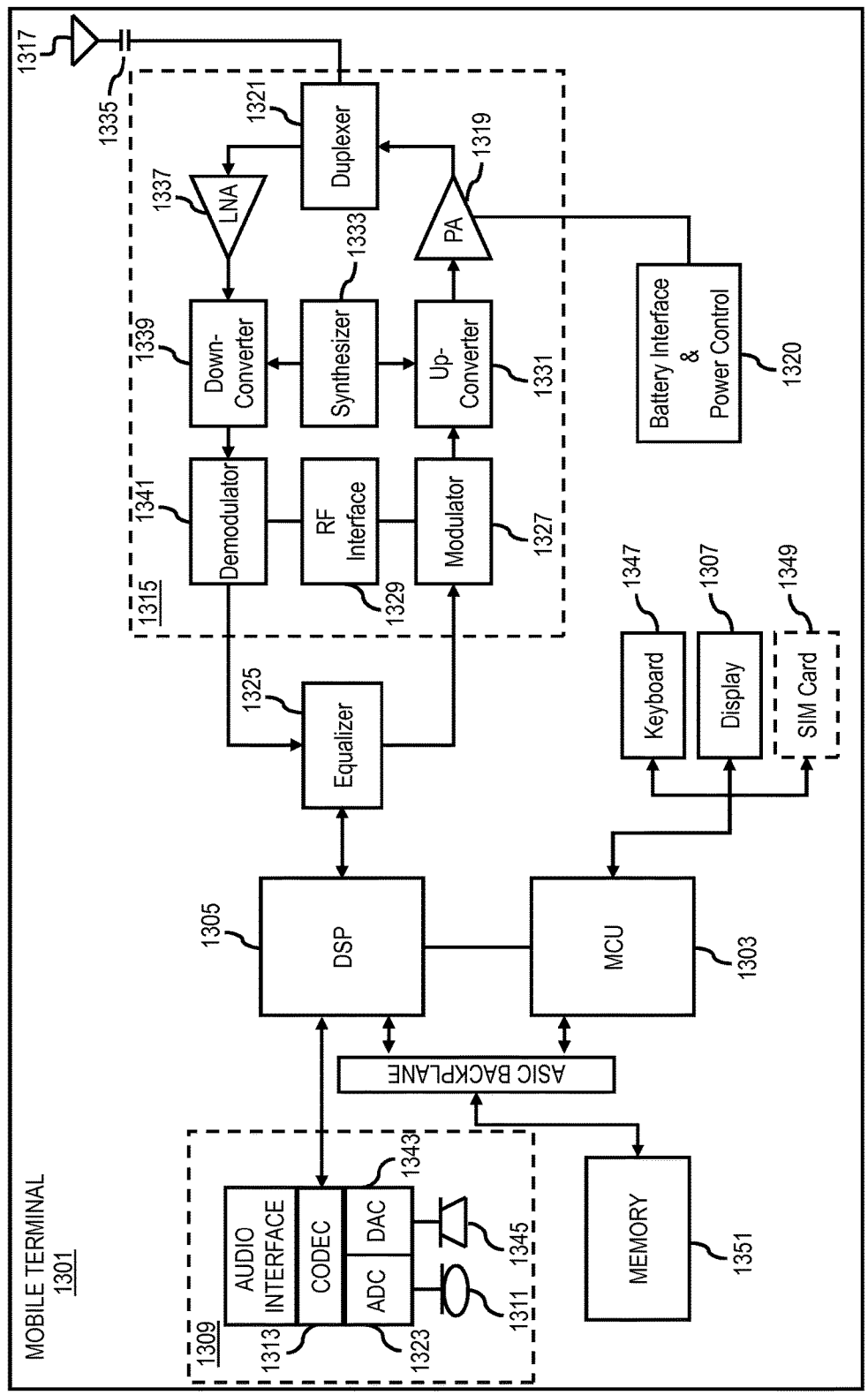
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of determining trajectory paths in a road network. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of determining trajectory paths in a road network. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to determine trajectory paths in a road network. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for determining trajectory paths across a transportation structure of a road network, the method comprising:
   determining a location of the transportation structure and a plurality of predetermined waypoints associated with the transportation structure;
   determining at least one data selection area including the transportation structure and the plurality of predetermined waypoints,
      wherein the determined data selection area is configured to exclude a second transportation structure,
      wherein the transportation structure is an interchange,
      wherein the interchange is characterized as a junction involving at least two roads and one or more ramps,
      wherein the interchange is further characterized as including grade separation configured to permit at least one traffic stream on at least one road of the at least two roads to pass through the interchange without interfering with another traffic stream on another road of the at least two roads,
      wherein the transportation structure is further characterized as including the plurality of predetermined waypoints representing points of entry and/or exit for traffic to enter into the transportation structure and/or to exit from the transportation structure,
      wherein the transportation structure is further characterized by having a plurality of trajectory paths for traversing the transportation structure and passing through one pair of waypoints while traveling in one direction through the pair of waypoints;
   determining probe data collected within the data selection area;
   determining first and second waypoints of the plurality of predetermined waypoints connecting the at least two roads and the one or more ramps including determining at least one first waypoint and at least one second waypoint of the transportation structure,
      wherein the at least one first waypoint of the plurality of predetermined waypoints represents at least one entry point to the transportation structure,
      wherein the at least one second waypoint of the plurality of predetermined waypoints represents at least one exit point from the transportation structure,
      wherein the at least one first waypoint and the at least one second waypoint are characterized by sharing a plurality of trajectory paths for traversing the transportation structure without interfering with another traffic stream after entering the transportation structure via the at least one first waypoint;
   designating, based on part of the probe data and the determined first and second waypoints, a plurality of location traces spanning the plurality of trajectory paths across a plurality of the first waypoints and a plurality of the second waypoints as a plurality of baseline paths;
   classifying a remaining portion of the probe data not designated as spanning both a first waypoint and a second waypoint,
      wherein the classifying is based, at least in part, on a threshold distance calculation, a heading comparison or some combination thereof; and
   designating the plurality of baseline paths as a proxy for map data representing the transportation structure.

2. A method of claim 1, further comprising:
   determining at least one direction of travel through the at least one first waypoint, the at least one second waypoint, or a combination thereof,
      wherein the at least one direction of travel is associated with the designated at least one baseline path,
      incorporating the at least one direction of travel into the designated at least one baseline path to enable improved differentiation among any overlapping location traces in the plurality of trajectory paths for traversing the transportation structure without interfering with another traffic stream after entering the transportation structure via the at least one first waypoint,
      wherein the at least one data selection area encompasses the transportation structure based on designating a reference point, associated with a location of the transportation structure, and proximity criteria with respect to the reference point,
      wherein designating the proximity criteria includes adopting a radius extending from the reference point.

3. A method of claim 1, further comprising:
   determining a best location trace that has a most number of location points, a best consistency of heading alignment, or a combination thereof, as part of the proxy.

4. A method of claim 3, further comprising:
   determining the best location trace without map-matching to externally-developed map data representing the transportation structure.

5. A method of claim 3, further comprising:
   determining the best location trace based,
      at least in part, on the at least one direction of travel.

6. A method of claim 1, further comprising:
   estimating an average time for vehicles, travelers, or a combination thereof, to travel through the transportation structure based on a simplified geometric representation of the transportation structure.

7. A method of claim 1, further comprising:
calculating at least one path line; and
determining a fit of one or more location traces to the at least one path line to within one or more threshold distance values.

8. A method of claim 7, further comprising:
if more than one of the one or more threshold distance values are satisfied, decreasing the one or more threshold distance values; and
initiating a redetermination of the fit based, at least in part, on the decreased one or more threshold distance values until one proxy candidate remains.

9. A method of claim 8, further comprising:
designating the one proxy candidate as part of the proxy.

10. An apparatus for determining trajectory paths across a transportation structure of a road network, the apparatus comprising:
at least one processor; and
at least one memory including computer program code for one or more programs,
the at least one memory and the computer program code configured to, with the at least one processor, cause the apparatus to perform at least the following:
determine a location of the transportation structure and a plurality of predetermined waypoints associated with the transportation structure;
determine at least one data selection area including the transportation structure and the plurality of predetermined waypoints,
wherein the determined data selection area is configured to exclude a second transportation structure,
wherein the transportation structure is an interchange,
wherein the interchange is characterized as a junction involving at least two roads and one or more ramps,
wherein the interchange is further characterized as including grade separation configured to permit at least one traffic stream on at least one road of the at least two roads to pass through the interchange without interfering with another traffic stream on another road of the at least two roads,
wherein the transportation structure is further characterized as including a plurality of predetermined waypoints representing points of entry and/or exit for traffic to enter into the transportation structure and/or to exit from the transportation structure,
wherein the transportation structure is further characterized by having a plurality of trajectory paths for traversing the transportation structure and passing through one pair of waypoints while traveling in one direction through the pair of waypoints,
determine probe data collected within the data selection area,
determine first and second waypoints of the plurality of predetermined waypoints connecting the transportation structure with the at least two roads and the one or more ramps including determining at least one first waypoint and at least one second waypoint of the transportation structure,
wherein the at least one first waypoint of the plurality of predetermined waypoints represents at least one entry point to the transportation structure,
wherein the at least one second waypoint of the plurality of predetermined waypoints represents at least one exit point from the transportation structure,
wherein the at least one first waypoint and the at least one second waypoint are characterized by sharing a plurality of trajectory paths for traversing the transportation structure without interfering with another traffic stream after entering the transportation structure via the at least one first waypoint;
designate, based on part of the probe data and the determined first and second waypoints, a plurality of location traces spanning the plurality of trajectory paths across a plurality of the first waypoints and a plurality of the second waypoints as a plurality of baseline paths;
classify a remaining portion of the probe data not designated as spanning both a first waypoint and a second waypoint,
wherein the classifying is based, at least in part, on a threshold distance calculation, a heading comparison or some combination thereof; and
designate the plurality of baseline paths as a proxy for map data representing the transportation structure.

11. An apparatus of claim 10, wherein the apparatus is further caused to:
determine at least one direction of travel through the at least one first waypoint, the at least one second waypoint, or a combination thereof,
wherein the at least one direction of travel is associated with the designated at least one baseline path,
incorporate the at least one direction of travel into the designated at least one baseline path to enable improved differentiation among any overlapping location traces in the plurality of trajectory paths for traversing the transportation structure without interfering with another traffic stream after entering the transportation structure via the at least one first waypoint,
wherein the at least one data selection area encompasses the transportation structure based on designating a reference point, associated with a location of the transportation structure, and proximity criteria with respect to the reference point,
wherein designating the proximity criteria includes adopting a radius extending from the reference point.

12. An apparatus of claim 10, wherein the apparatus is further caused to:
estimate an average time for vehicles, travelers, or a combination thereof, to travel through the transportation structure based on a simplified geometric representation of the transportation structure.

13. An apparatus of claim 10, wherein the apparatus is further caused to:
calculate at least one path line; and
determine a fit of one or more location traces to the at least one path line to within one or more threshold distance values.

14. An apparatus of claim 13, wherein the apparatus is further caused to:
if at least one of the one or more threshold distance values are satisfied, cause, at least in part, a decrease of the one or more threshold distance values; and
initiate a redetermination of the fit based, at least in part, on the decreased one or more threshold distance values.

15. A non-transitory computer-readable storage medium carrying one or more sequences of one or more instructions which, when executed by one or more processors, cause an apparatus to at least perform the following steps for determining trajectory paths across a transportation structure of a road network:
determining a location of the transportation structure and a plurality of predetermined waypoints associated with the transportation structure;

determining at least one data selection area including the transportation structure and the plurality of predetermined waypoints,
  wherein the determined data selection area is configured to exclude a second transportation structure,
  wherein the transportation structure is an interchange,
  wherein the interchange is characterized as a junction involving at least two roads and one or more ramps,
  wherein the interchange is further characterized as including grade separation configured to permit at least one traffic stream on at least one road of the at least two roads to pass through the interchange without interfering with another traffic stream on another road of the at least two roads,
  wherein the transportation structure is further characterized as including a plurality of predetermined waypoints representing points of entry and/or exit for traffic to enter into the transportation structure and/or to exit from the transportation structure,
  wherein the transportation structure is further characterized by having a plurality of trajectory paths for traversing the transportation structure without interfering with another traffic stream and passing through one pair of waypoints while traveling in one direction through the pair of waypoints,
determining probe data collected within the data selection area,
determining first and second waypoints of the plurality of predetermined waypoints connecting the at least two roads and the one or more ramps including determining at least one first waypoint and at least one second waypoint of the transportation structure,
  wherein the at least one first waypoint of the plurality of predetermined waypoints represents at least one entry point to the transportation structure,
  wherein the at least one second waypoint of the plurality of predetermined waypoints represents at least one exit point from the transportation structure,
  wherein the at least one first waypoint and the at least one second waypoint are characterized by sharing a plurality of trajectory paths for traversing the transportation structure after entering the transportation structure via the at least one first waypoint;

designating, based on part of the probe data and the determined first and second waypoints, a plurality of location traces spanning the plurality of trajectory paths across a plurality of the first waypoints and a plurality of the second waypoints as a plurality of baseline paths;
classifying a remaining portion of the probe data not designated as spanning both a first waypoint and a second waypoint,
  wherein the classifying is based, at least in part, on a threshold distance calculation, a heading comparison or some combination thereof; and
designating the plurality of baseline paths as a proxy for map data representing the transportation structure.

16. A non-transitory computer-readable storage medium of claim 15, wherein the apparatus is further caused to perform:
determining at least one direction of travel through the at least one first waypoint, the at least one second waypoint, or a combination thereof,
  wherein the at least one direction of travel is associated with the designated at least one baseline path,
  incorporating the at least one direction of travel into the designated at least one baseline path to enable improved differentiation among any overlapping location traces in the plurality of trajectory paths for traversing the transportation structure without interfering with another traffic stream after entering the transportation structure via the at least one first waypoint,
  wherein the at least one data selection area encompasses the transportation structure based on designating a reference point, associated with a location of the transportation structure, and proximity criteria with respect to the reference point,
  wherein designating the proximity criteria includes adopting a radius extending from the reference point.

17. A non-transitory computer-readable storage medium of claim 15, wherein the apparatus is further caused to perform:
estimating an average time for vehicles, travelers, or a combination thereof, to travel through the transportation structure based on a simplified geometric representation of the transportation structure.

* * * * *